(12) United States Patent
Kim et al.

(10) Patent No.: US 9,654,961 B2
(45) Date of Patent: *May 16, 2017

(54) METHOD FOR DEVICE TO DEVICE COMMUNICATION IN A WIRELESS COMMUNICATION SYSTEM AND APPARATUS THEREFOR

(71) Applicant: LG ELECTRONICS INC., Seoul (KR)

(72) Inventors: Suhwook Kim, Seoul (KR); Jinyoung Chun, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/782,007

(22) PCT Filed: Apr. 3, 2014

(86) PCT No.: PCT/KR2014/002883
§ 371 (c)(1),
(2) Date: Oct. 2, 2015

(87) PCT Pub. No.: WO2014/163410
PCT Pub. Date: Oct. 9, 2014

(65) Prior Publication Data
US 2016/0050552 A1    Feb. 18, 2016

Related U.S. Application Data

(60) Provisional application No. 61/808,605, filed on Apr. 4, 2013.

(51) Int. Cl.
*H04W 76/02*    (2009.01)
*H04W 8/00*    (2009.01)
(Continued)

(52) U.S. Cl.
CPC ......... *H04W 8/005* (2013.01); *H04W 76/023* (2013.01); *H04W 76/043* (2013.01); *H04L 5/0012* (2013.01); *H04L 5/0037* (2013.01)

(58) Field of Classification Search
None
See application file for complete search history.

(56) References Cited

U.S. PATENT DOCUMENTS

2010/0062711 A1    3/2010  Park
2012/0300812 A1    11/2012 Ly-Gagnon et al.
(Continued)

FOREIGN PATENT DOCUMENTS

KR    10-2005-0071610 A    7/2005
KR    10-2005-0090119 A1   9/2005
KR    10-2009-0003946 A    1/2009

*Primary Examiner* — Diane Mizrahi
(74) *Attorney, Agent, or Firm* — Dentons US LLP

(57) ABSTRACT

The present invention relates to a Method for a device-to-device (D2D) communication in a wireless communication system. Specifically, when a terminal, which is performing a device-to-device communication while performing channel hopping, additionally performs the device-to-device communication with a new terminal, a channel hopping period of the existing device to device communication is configured by same time intervals for channels and one time interval among the same time intervals is configured to be identical to a channel hopping period for discovering a new terminal.

13 Claims, 25 Drawing Sheets

(51) Int. Cl.
*H04W 76/04* (2009.01)
*H04L 5/00* (2006.01)

(56) References Cited

U.S. PATENT DOCUMENTS

| | | | |
|---|---|---|---|
| 2015/0223235 A1* | 8/2015 | Hwang | H04B 7/02 370/329 |
| 2016/0037323 A1* | 2/2016 | Kim | H04W 8/005 370/329 |
| 2016/0095147 A1* | 3/2016 | Kim | H04W 8/005 370/329 |
| 2016/0134396 A1* | 5/2016 | Guerreiro | H04L 27/0006 370/329 |

* cited by examiner

FIG. 6
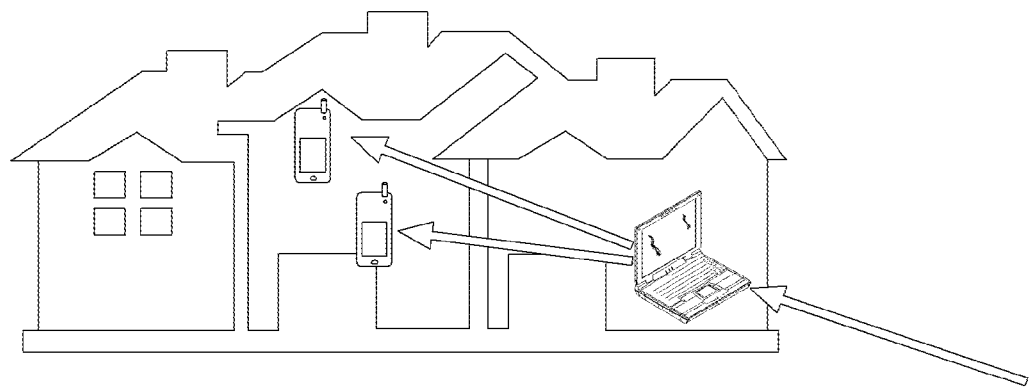
(a)
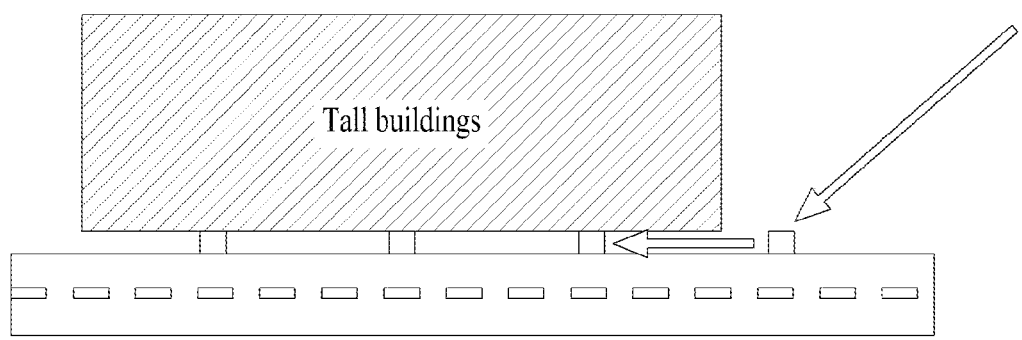
(b)

FIG. 7
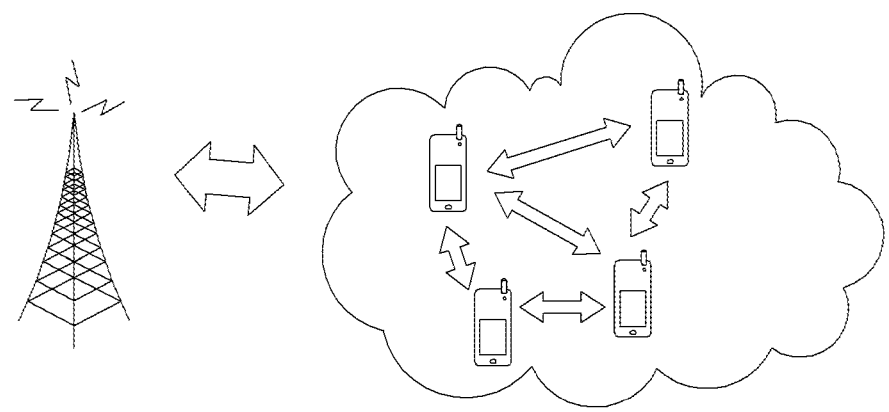
(a)
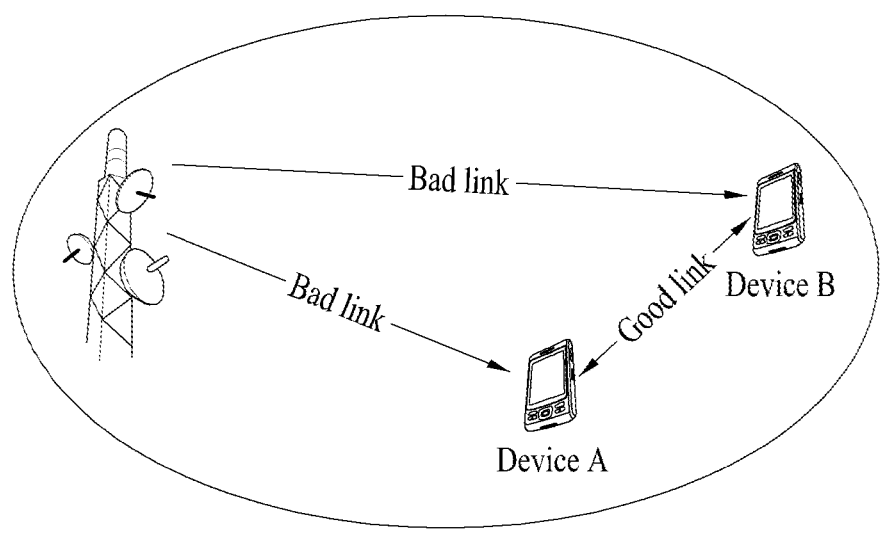
(b)

FIG. 27
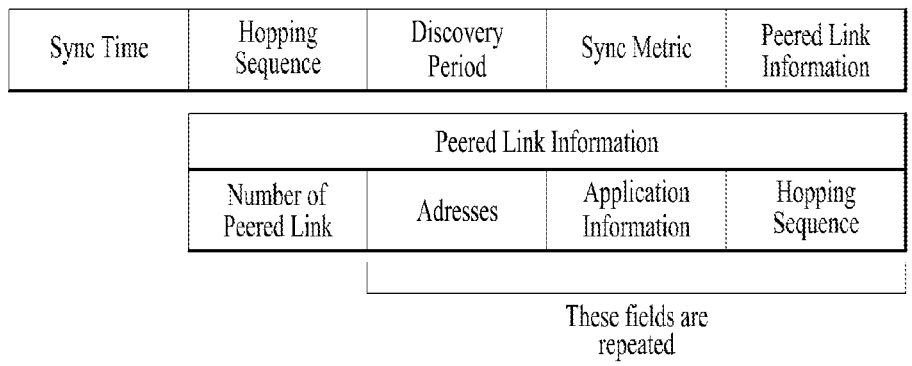
FIG. 28
| Sync Time | Hopping Sequence | Discovery Period | Application Information | Sync Metric | Guard Time |
|---|---|---|---|---|---|
FIG. 29
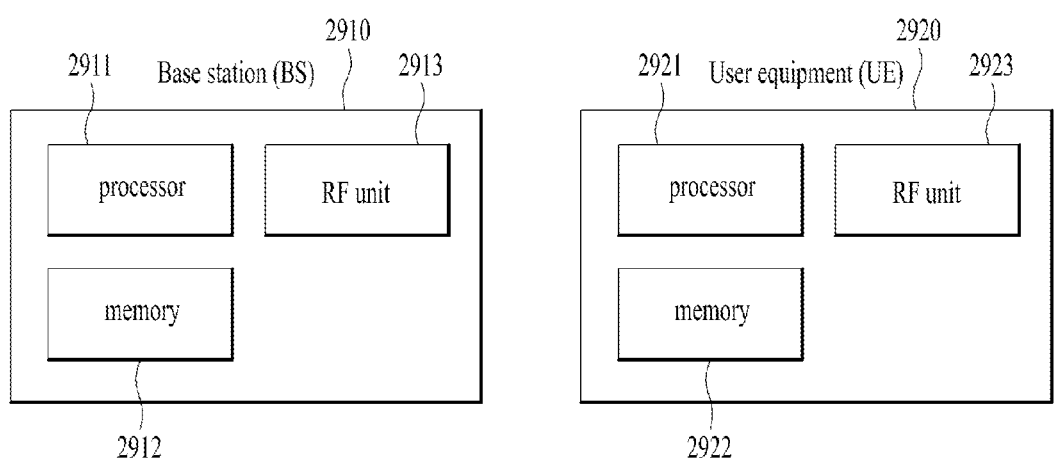

METHOD FOR DEVICE TO DEVICE COMMUNICATION IN A WIRELESS COMMUNICATION SYSTEM AND APPARATUS THEREFOR

This application is a 35 USC §371 National Stage entry of International Application No. PCT/KR2014/002883 filed on Apr. 3, 2014, which claims priority to U.S. Provisional Application No. 61/808,605 filed on Apr. 4, 2013, all of which are incorporated by reference in their entirety herein.

TECHNICAL FIELD

The present invention relates to a wireless communication system, and particularly, to a method for efficient device-to-device (D2D) communication in a wireless communication system and apparatus therefor. More particularly, the present invention relates to a method for a user equipment performing D2D communication to discover a new user equipment and apparatus therefor.

BACKGROUND ART

In cellular communication, in order to perform a communication, a user equipment located in a cell accesses a base station, receives control information for exchanging data from the base station, and is then able to exchange the data with the base station. In particular, since a user equipment transceives data through a base station, in order for one cellular user equipment to transmit data to another cellular user equipment, the former cellular user equipment transmits its data to the base station and the base station having received the data then transmits the received data to the latter cellular user equipment. Thus, in order for one user equipment to transmit data to another user equipment, since the former user equipment can transmit the data through the base station only, the base station performs scheduling on a channel and resource for the data transceiving and should transmit the scheduled information to each of the user equipment. Thus, in order to perform a communication between user equipment through a base station, the base station needs to allocate channel and resource for transceiving data to each of the user equipment. However, device-to-device communication has a structure to enable a user equipment to directly transceive data with a target user equipment without using a base station or relay node.

If device-to-device (D2D) communication for transceiving data in direct between user equipment is performed in a manner of sharing resources with an existing cellular network mentioned in the above description, each user equipment proceeds with the D2D communication after completion of resource allocation for the D2D communication. However, a method of transmitting an initial signal for initiating D2D communication has not been defined yet. Moreover, if the D2D communication for transceiving data in direct between user equipment is performed in a manner of sharing resources with the existing cellular network mentioned in the above description, it may cause a problem, to a user equipment currently performing the D2D communication, that synchronization with a user equipment currently performing D2D communication with the cellular network is mismatched or a problem that synchronization between user equipment currently performing D2D communications with different user equipment is mismatched.

DISCLOSURE OF THE INVENTION

Technical Task

The technical task of the present invention is to provide a method for device-to-device (D2D) communication in a wireless communication and apparatus therefor. Particularly, the technical task of the present invention is to provide a method for a user equipment performing channel hopping to discover a new user equipment.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is in a wireless communication system, a method of performing device-to-device (D2D) communication, comprising: communicating, by a first user equipment, with an existing connected user equipment currently connected with the first user equipment through at least one channel among a plurality of channels while hopping on a plurality of the channels based on a first channel hopping period and a first channel hopping sequence, discovering, by the first user equipment, a second user equipment to newly connect with while hopping on a plurality of the channels based on a second channel hopping period and a second channel hopping sequence, and performing, by the first user equipment, synchronization with the discovered second user equipment. The first channel hopping period may include identical time intervals for each of the plurality of the channels. And, one time interval among the configured time intervals may be set equal to the second channel hopping period.

Preferably, the discovering the second user equipment to newly connect with may include discovering the second user equipment by repeating a channel hopping twice based on the second channel hopping sequence during a double of the second channel hopping period.

Preferably, the first channel hopping sequence of the first user equipment may be different from the second channel hopping sequence of the first user equipment.

Preferably, the first channel hopping sequence of the first user equipment may be identical to the second channel hopping sequence of the first user equipment.

Preferably, the performing, by a first user equipment, the synchronization with the second user equipment may further include transmitting, by a first user equipment, a connection request message to the second user equipment and receiving a connection response message in response to the connection request message from the second user equipment. The connection request message may include synchronization information of the first user equipment and channel hopping sequence information of the first user equipment.

Preferably, the method of performing D2D communication may include performing, by a first user equipment, the synchronization with the second user equipment and performing, by a first user equipment, synchronization with the existing connected user equipment based on the synchronization matched with the second user equipment.

More preferably, the method of performing D2D communication may include communicating, by a first user equipment, with the second user equipment and the existing connected user equipment after an elapse of a prescribed time since performing the synchronization with the second user equipment and the existing connected user equipment.

Preferably, the discovering, by a first user equipment, the second user equipment to newly connect with may include transmitting, by a first user equipment, a probe request message to the second user equipment and receiving, by a first user equipment, a probe response message in response to the probe request message from the second user equipment.

More preferably, a scheme for the first user equipment to transmit the probe request message may include one of unicast, multicast and broadcast.

Preferably, the first channel hopping sequence of the first user equipment before discovering the second user equipment is different from a channel hopping sequence after performing the synchronization with the second user equipment.

Preferably, the second user equipment may perform the D2D communication with a user equipment other than the first user equipment.

In a second technical aspect of the present invention, provided herein is in a wireless communication system, a method of performing device-to-device (D2D) communication, including receiving, by a second user equipment, a probe request message from a first user equipment, transmitting, by a second user equipment, a probe response message in response to the probe request message to the first user equipment, and performing, by a second user equipment, synchronization with the first user equipment. The first user equipment communicates with an existing connected user equipment currently connected with the first user equipment through at least one channel among a plurality of channels while hopping on a plurality of the channels based on a first channel hopping sequence during a first channel hopping period. The first user equipment transmits the probe request message to the second user equipment while hopping on a plurality of the channels based on a second channel hopping period and a second channel hopping sequence. The first channel hopping period may include identical time intervals for each of the plurality of the channels. And, one time interval among the configured time intervals may be set equal to the second channel hopping period.

Advantageous Effects

According to an embodiment of the present invention, a method of efficiently performing device-to-device (D2D) communication in a wireless communication system and apparatus therefor can be provided.

Particularly, according to an embodiment of the present invention, a method of efficiently performing synchronization, by which is performed by a user equipment performing channel hopping in case of performing D2D communication with a new user equipment and apparatus therefor can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, although the present invention is described centering on IEEE 802.11 system, the technical idea of the present invention may be non-limited to IEEE 802.11 system.

Figure 1:
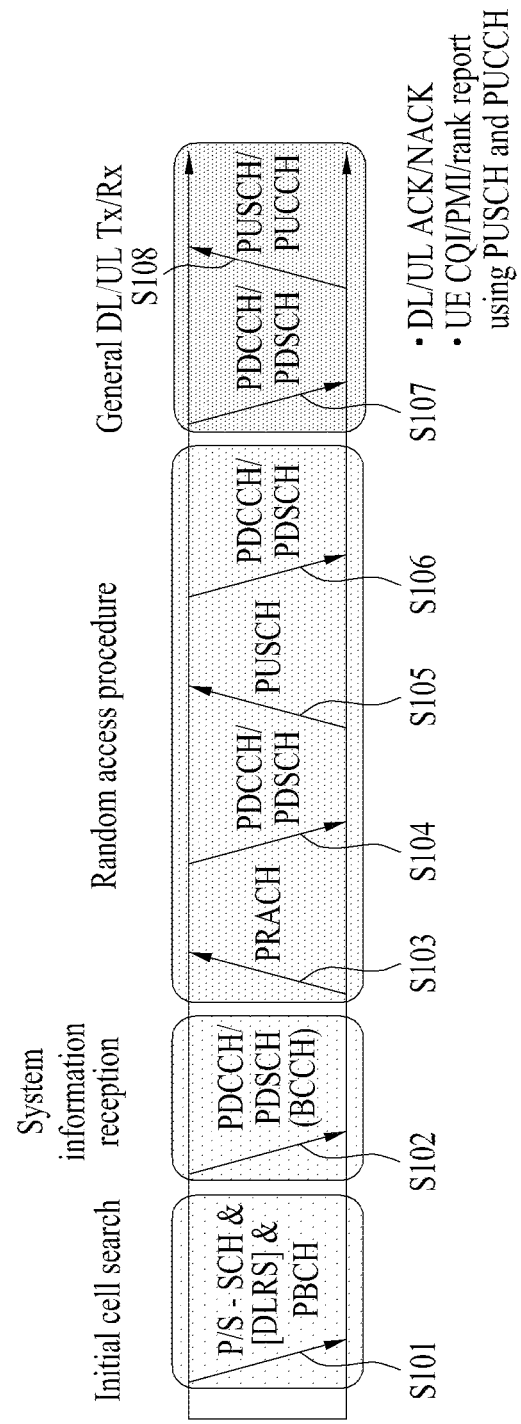

FIG. 1 is a diagram to describe physical channels used in 3GPP LTE system and a general signal transmission method using the same.

Figure 2:
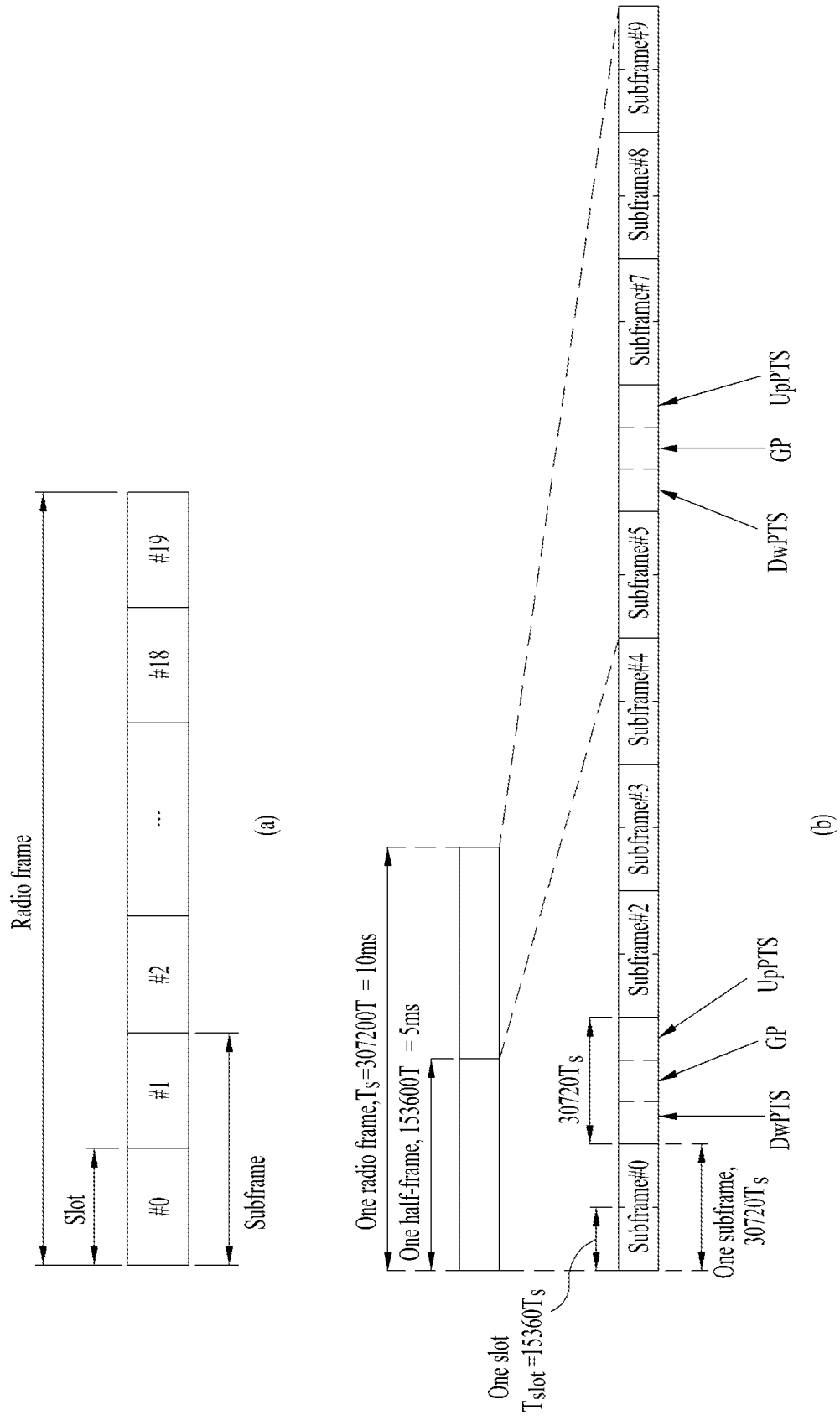

FIG. 2 is a diagram for a structure of a radio frame in 3GPP LTE.

Figure 3:
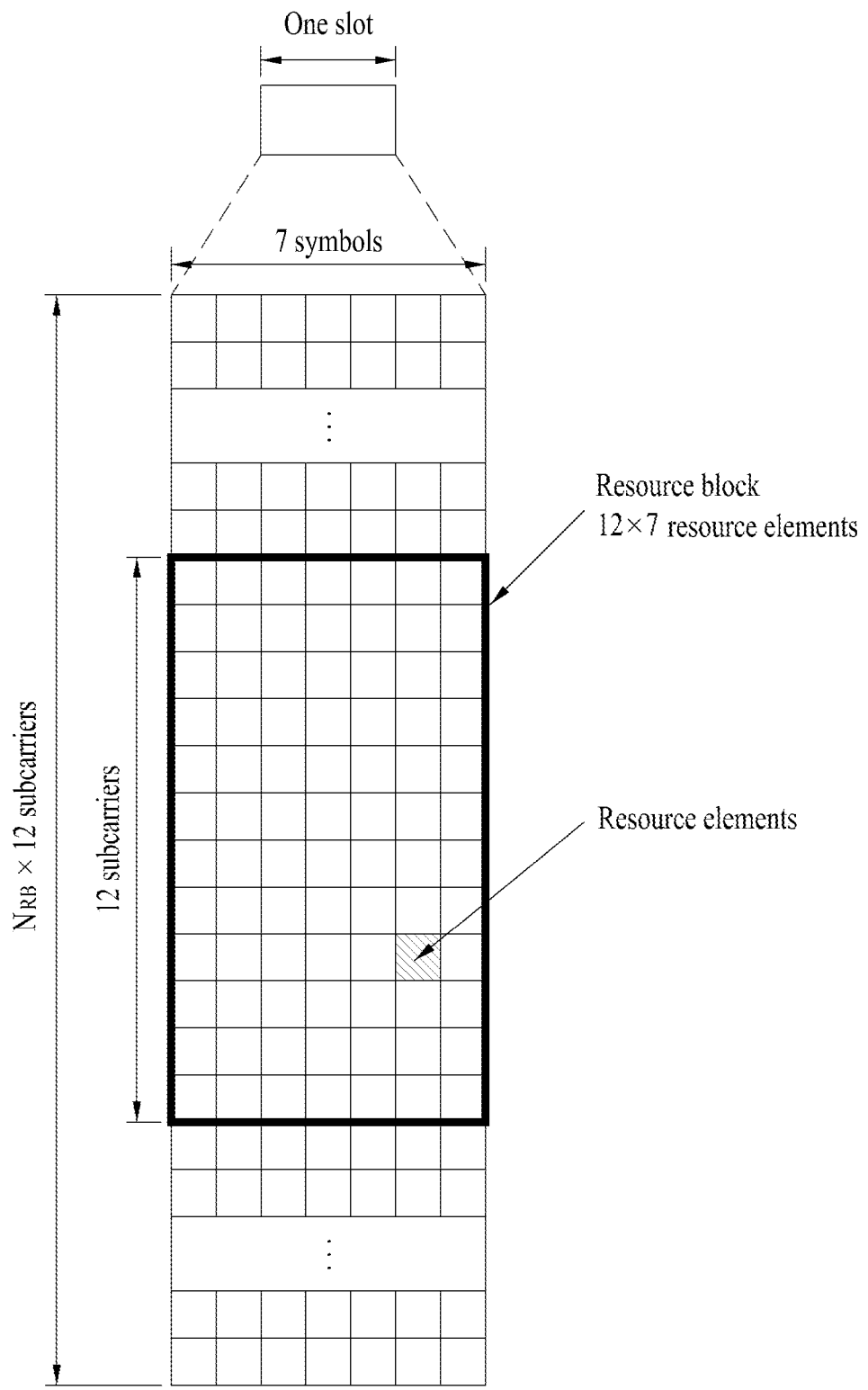

FIG. 3 is a diagram for an example of a resource grid for a single downlink slot.

Figure 4:
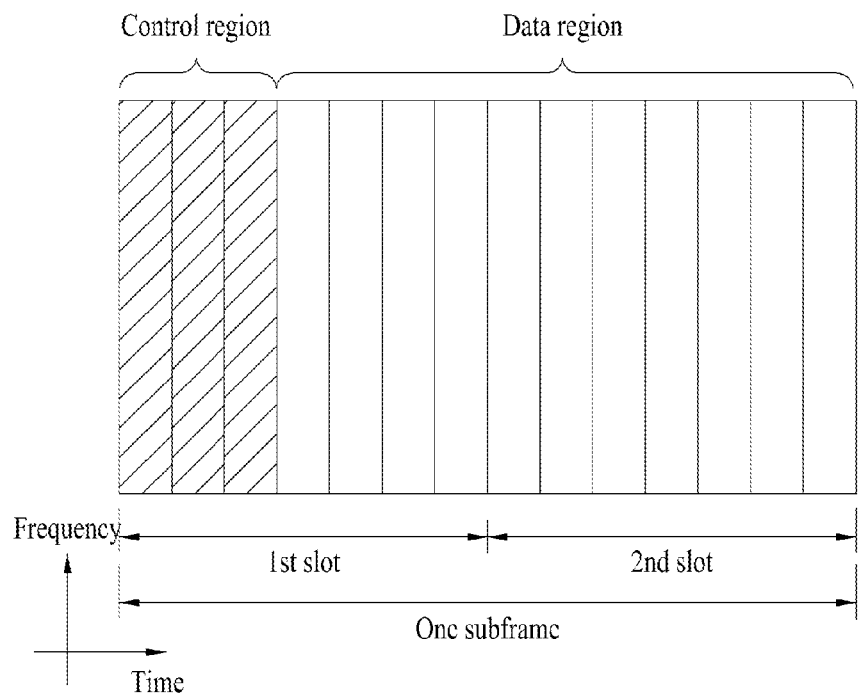

FIG. 4 is a diagram for a structure of a downlink subframe.

Figure 5:
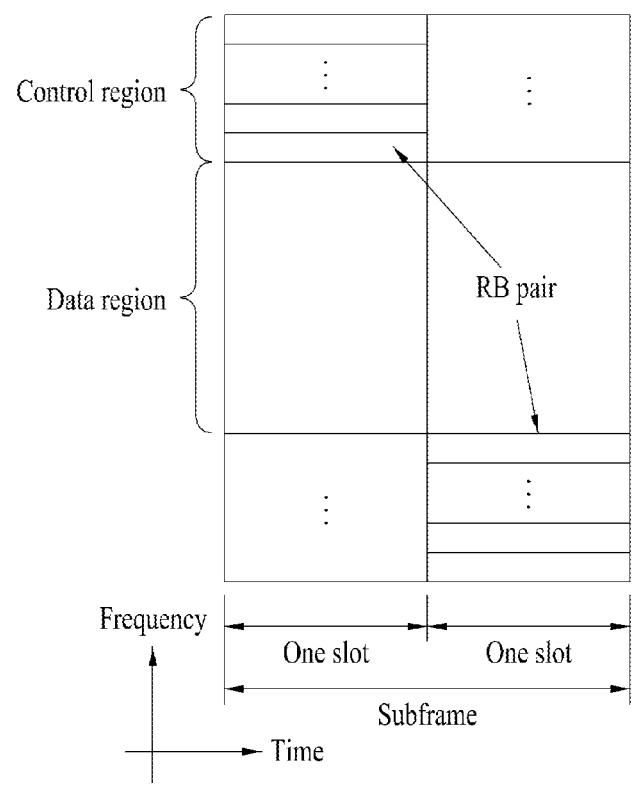

FIG. 5 is a diagram for a structure of an uplink subframe.

FIGS. 6 and 7 are diagrams for examples of applying D2D communication.

Figure 8:
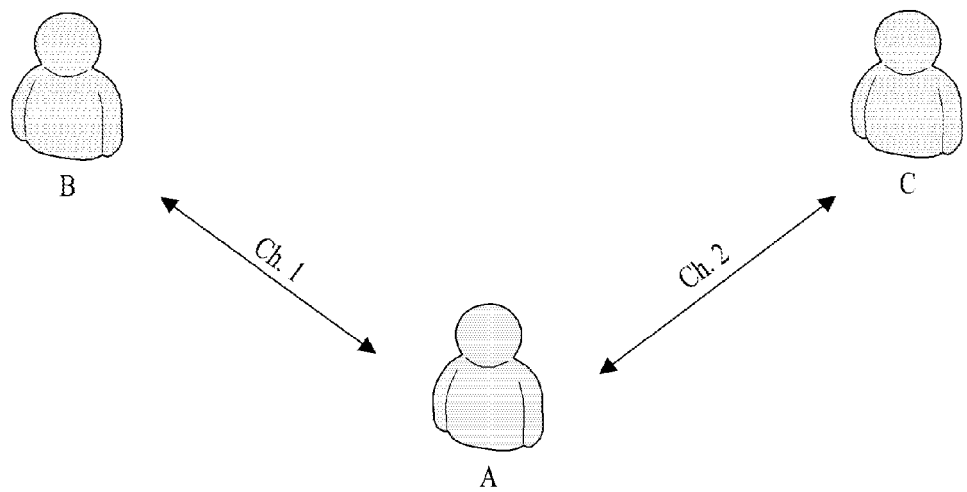

FIG. 8 is a diagram for one example of channel hopping of a user equipment.

Figure 9:
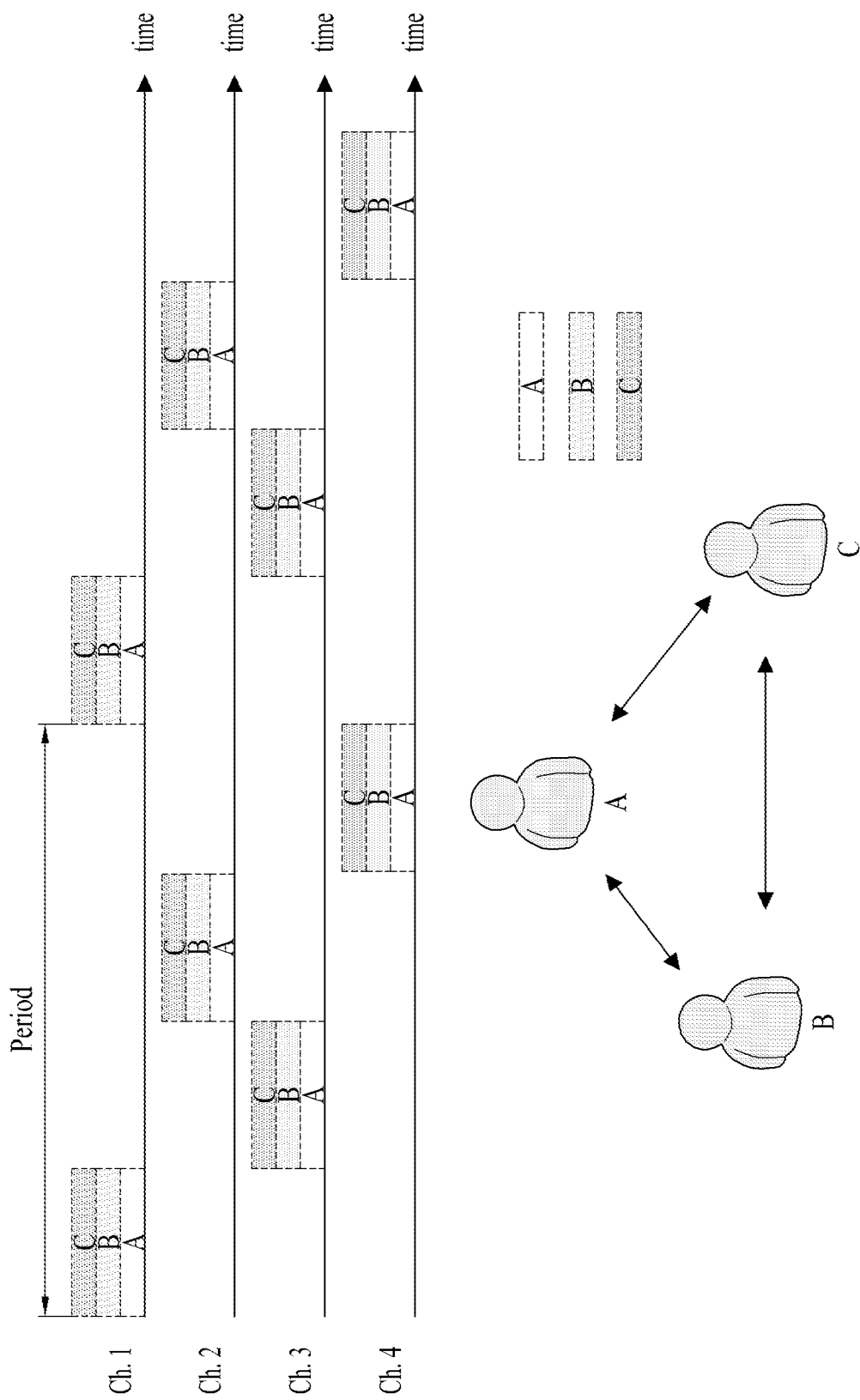

FIG. 9 is a diagram for one example of channel hopping in a D2D communication environment.

Figure 10:
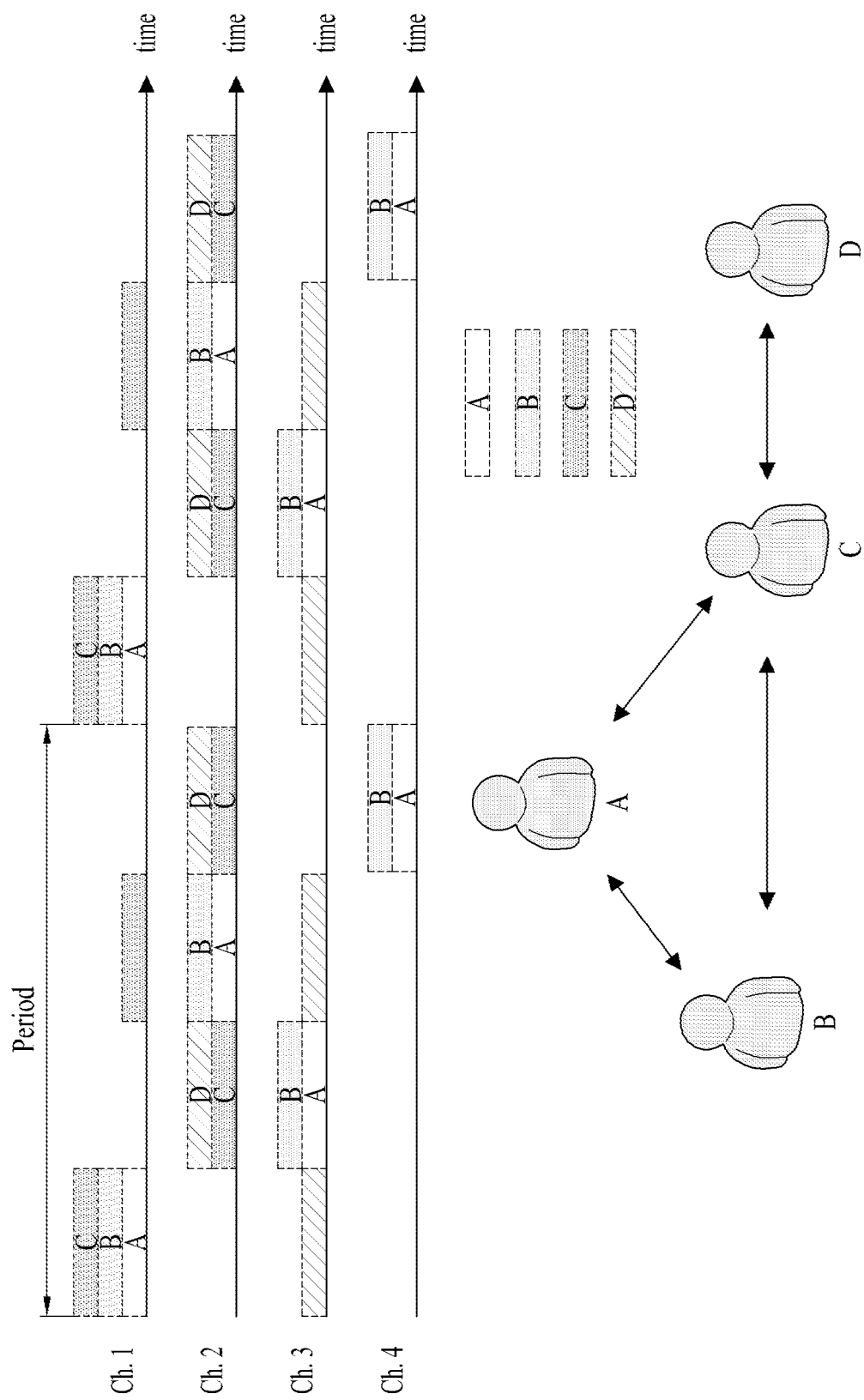

FIG. 10 is a diagram for one example of D2D communication.

Figure 11:
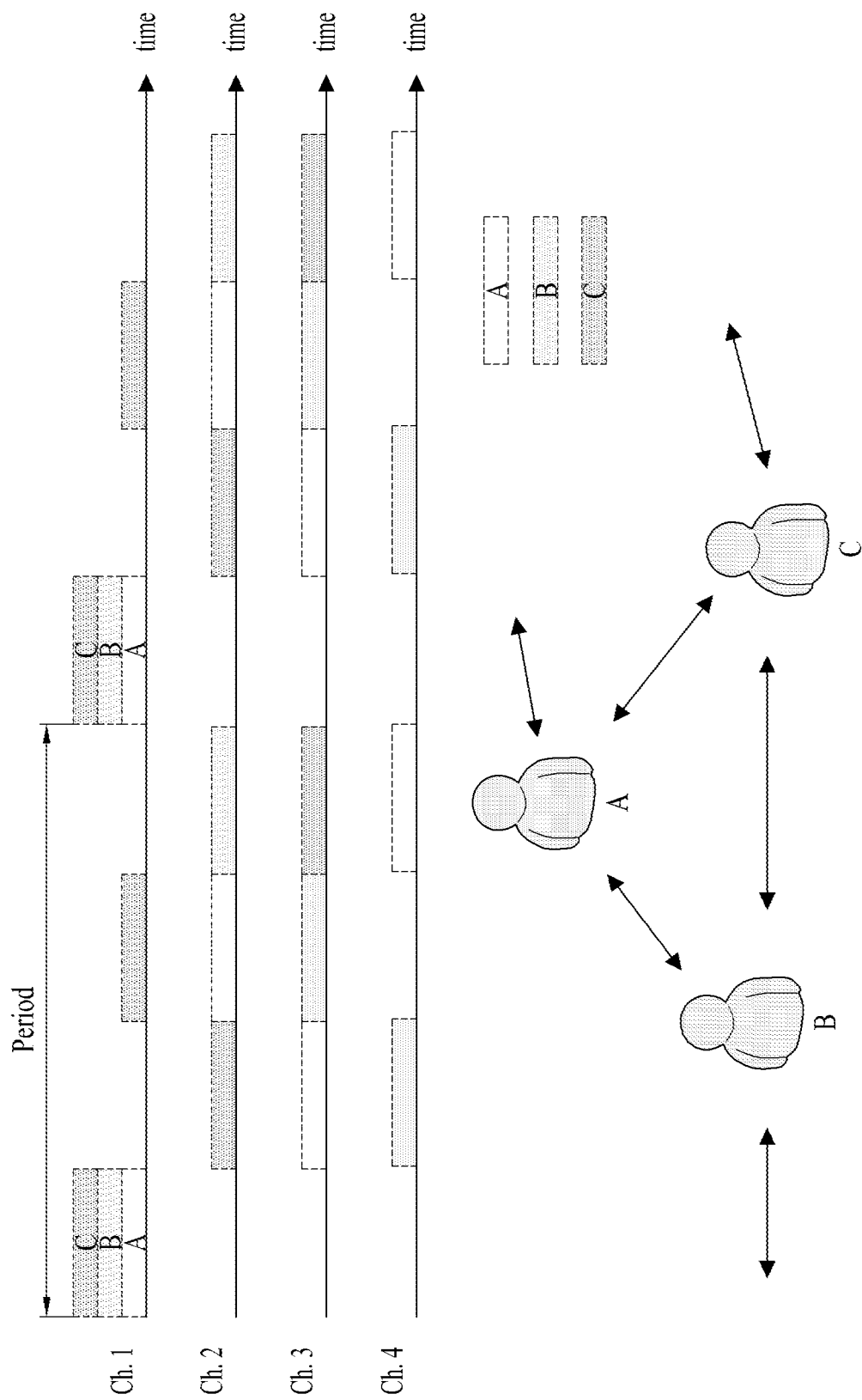
Figure 12:
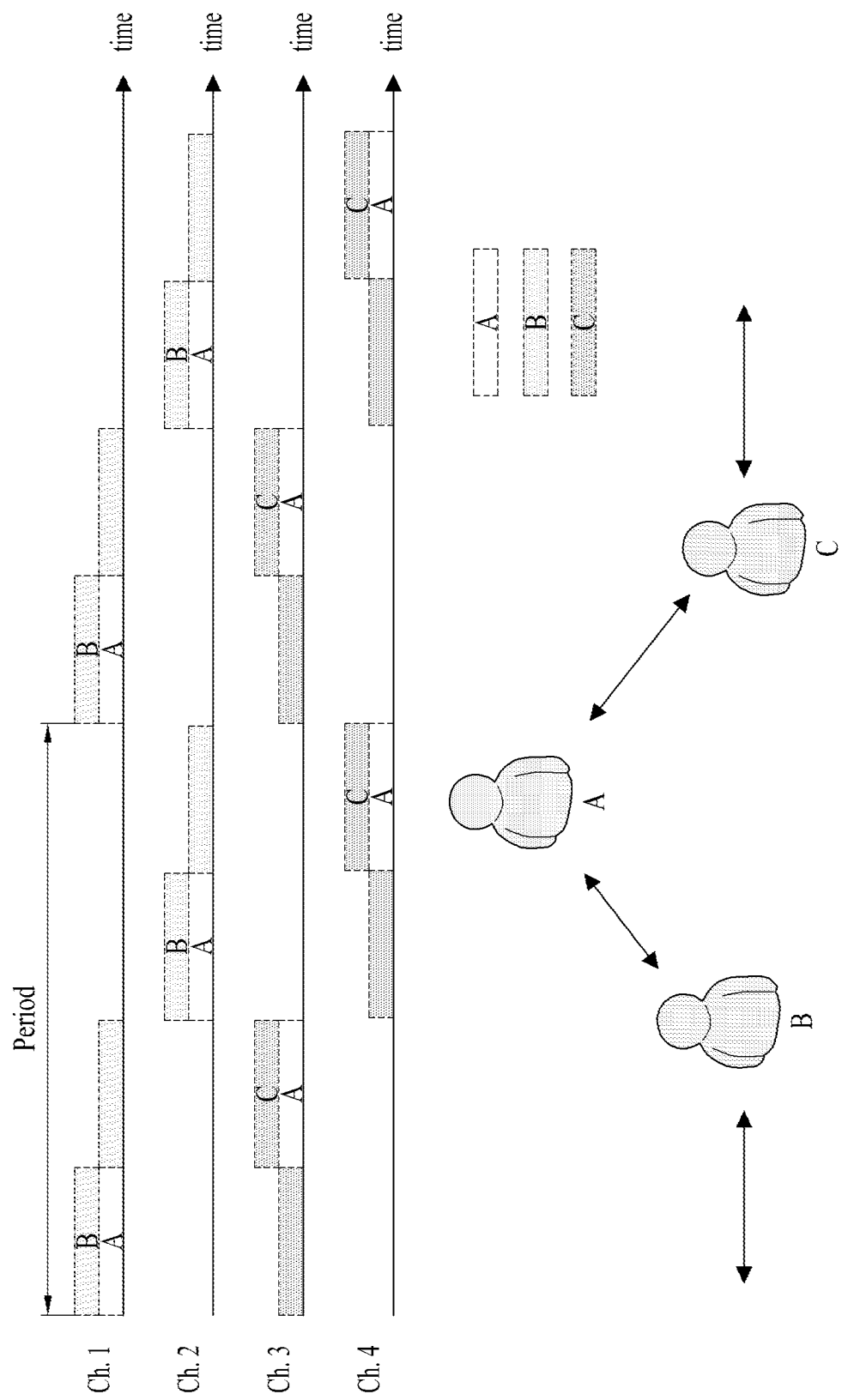

FIGS. 11 and 12 are diagrams for other examples of D2D communication.

Figure 13:
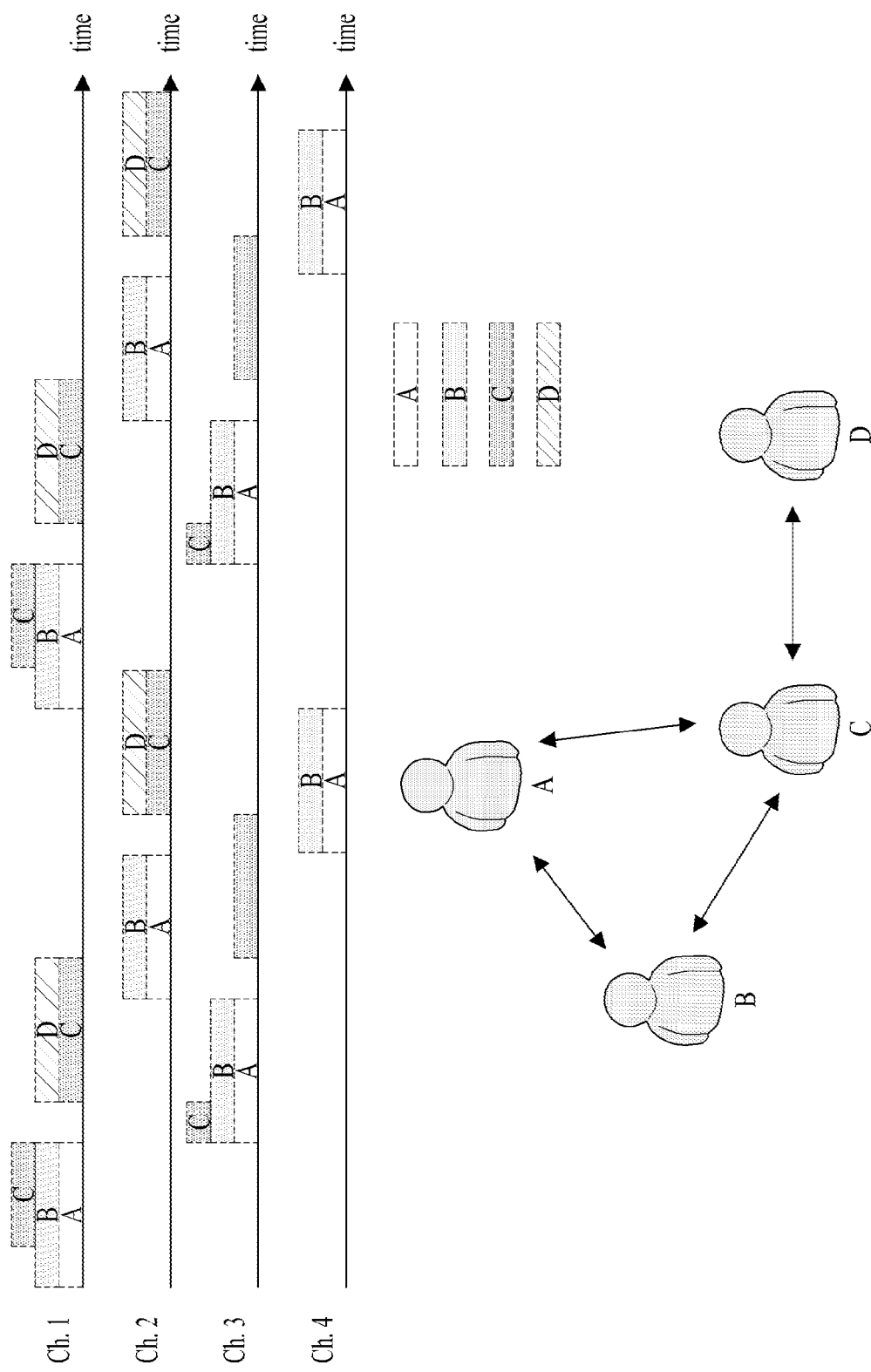
Figure 14:
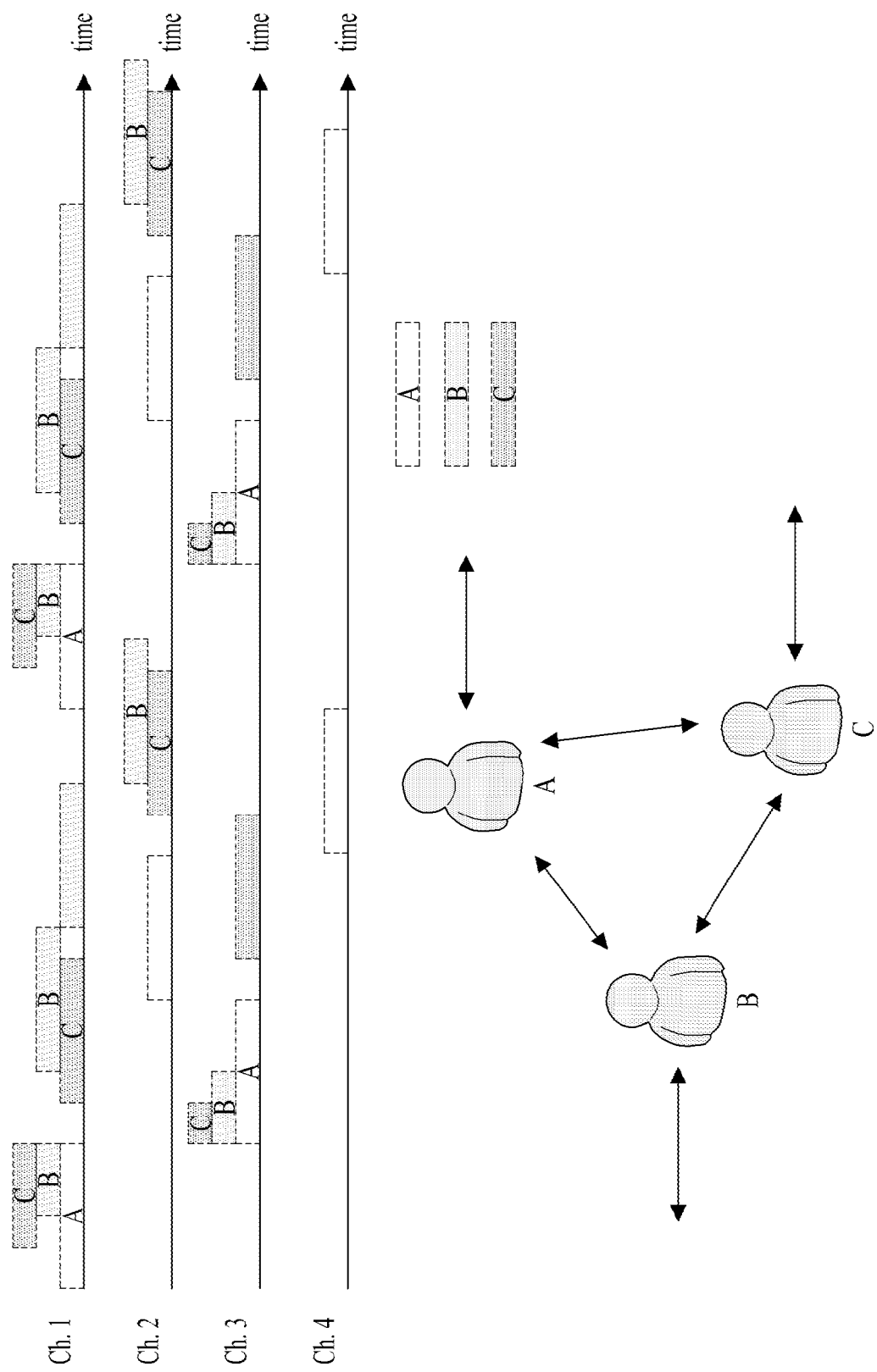

FIGS. 13 and 14 are diagrams for other examples of D2D communication in the present invention.

Figure 15:
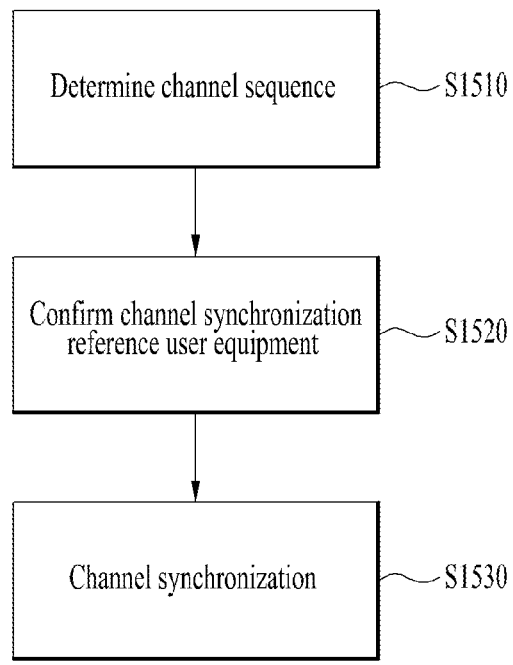

FIG. 15 is a diagram for one example of a channel synchronization process.

Figure 16:
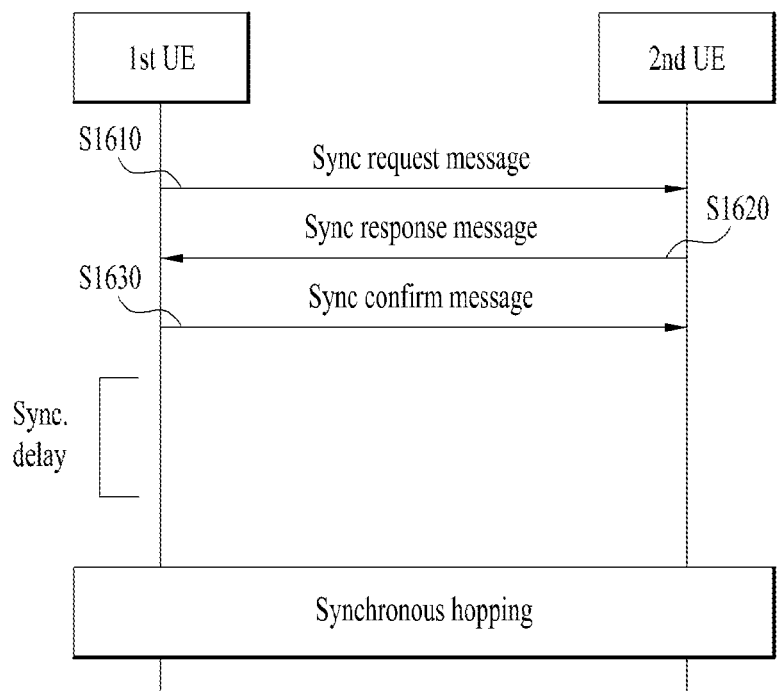

FIG. 16 is a flowchart for one example of a channel synchronization process.

Figure 17:
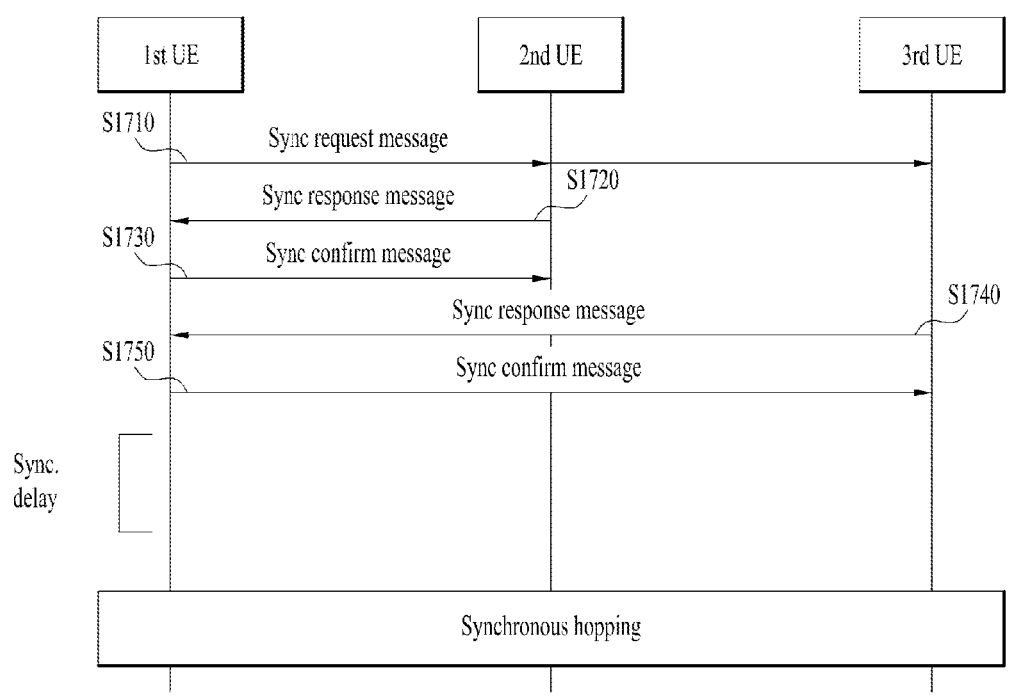

FIG. 17 is a flowchart for another example of a channel synchronization process.

Figure 18:
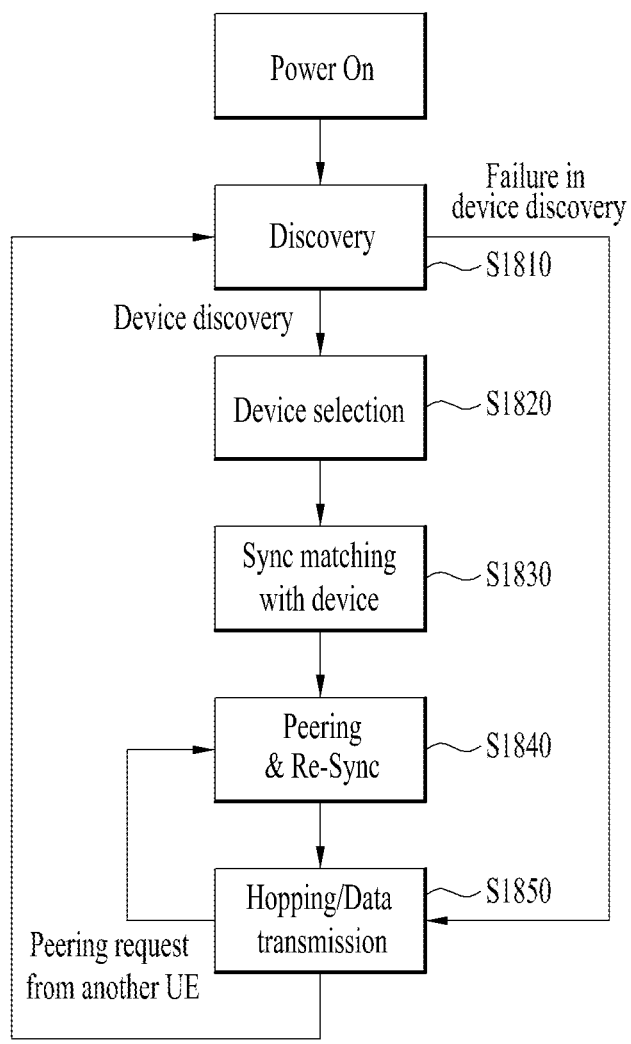

FIG. 18 is a flowchart of a user equipment discovery process according to one embodiment of the present invention.

Figure 19:
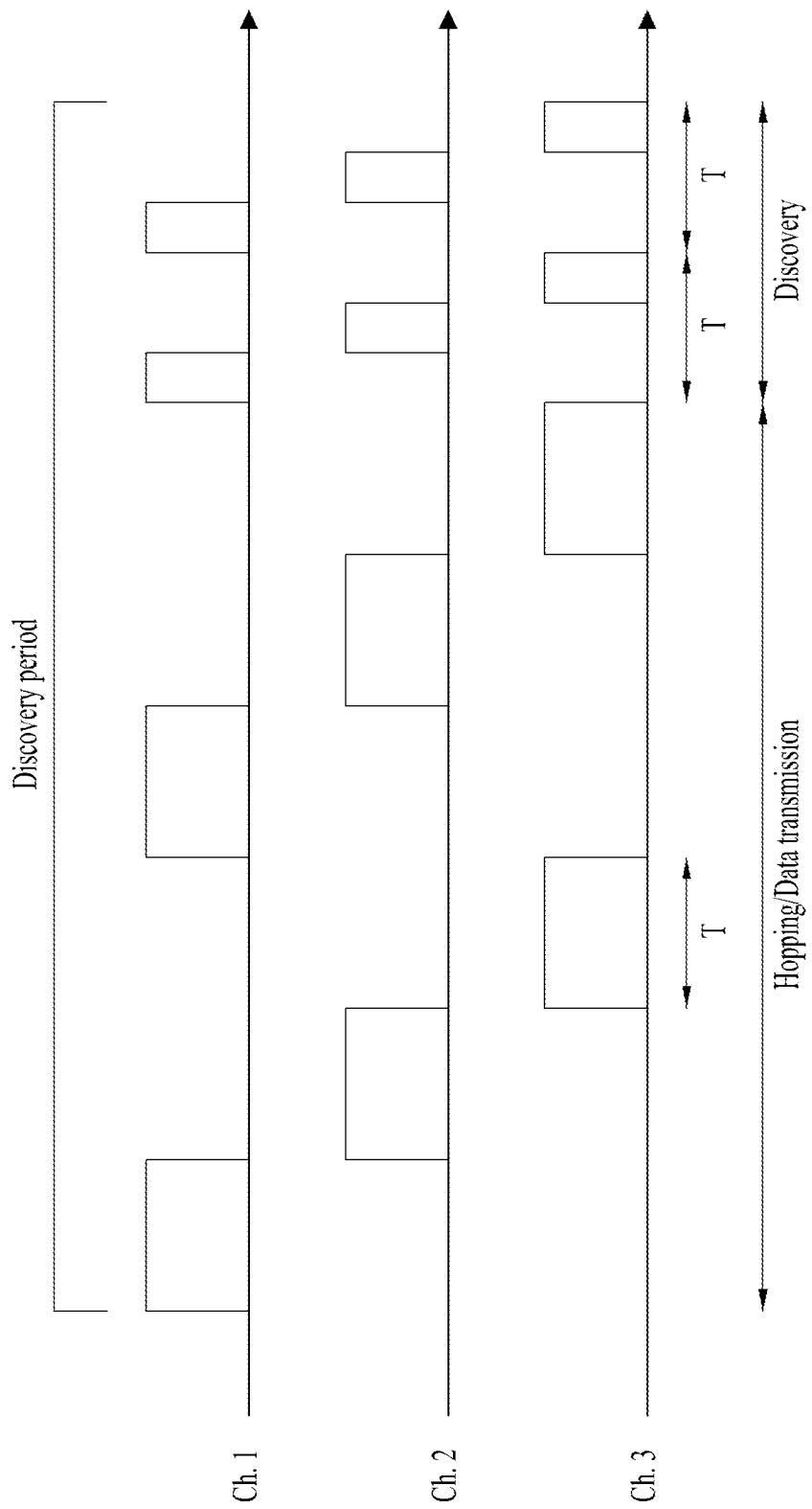
Figure 20:
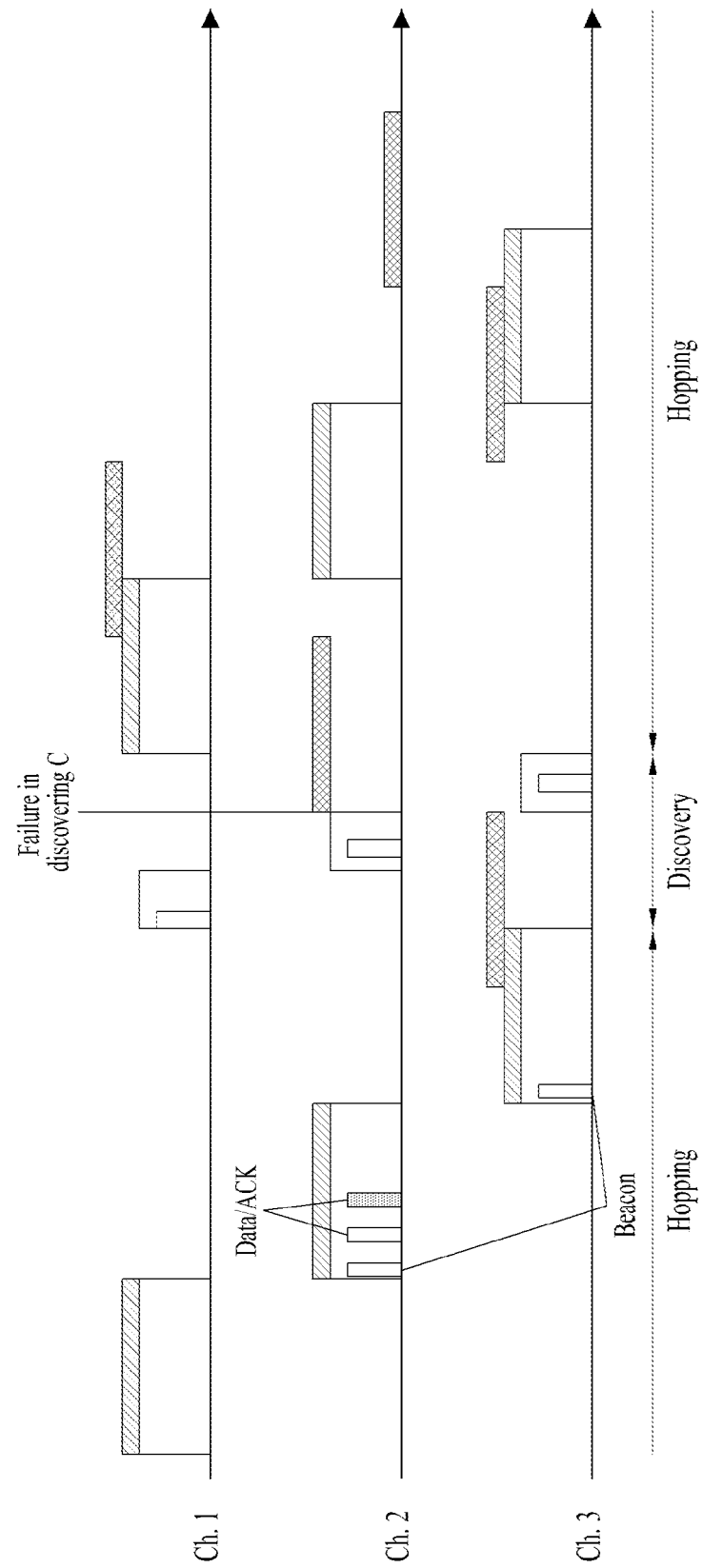
Figure 21:
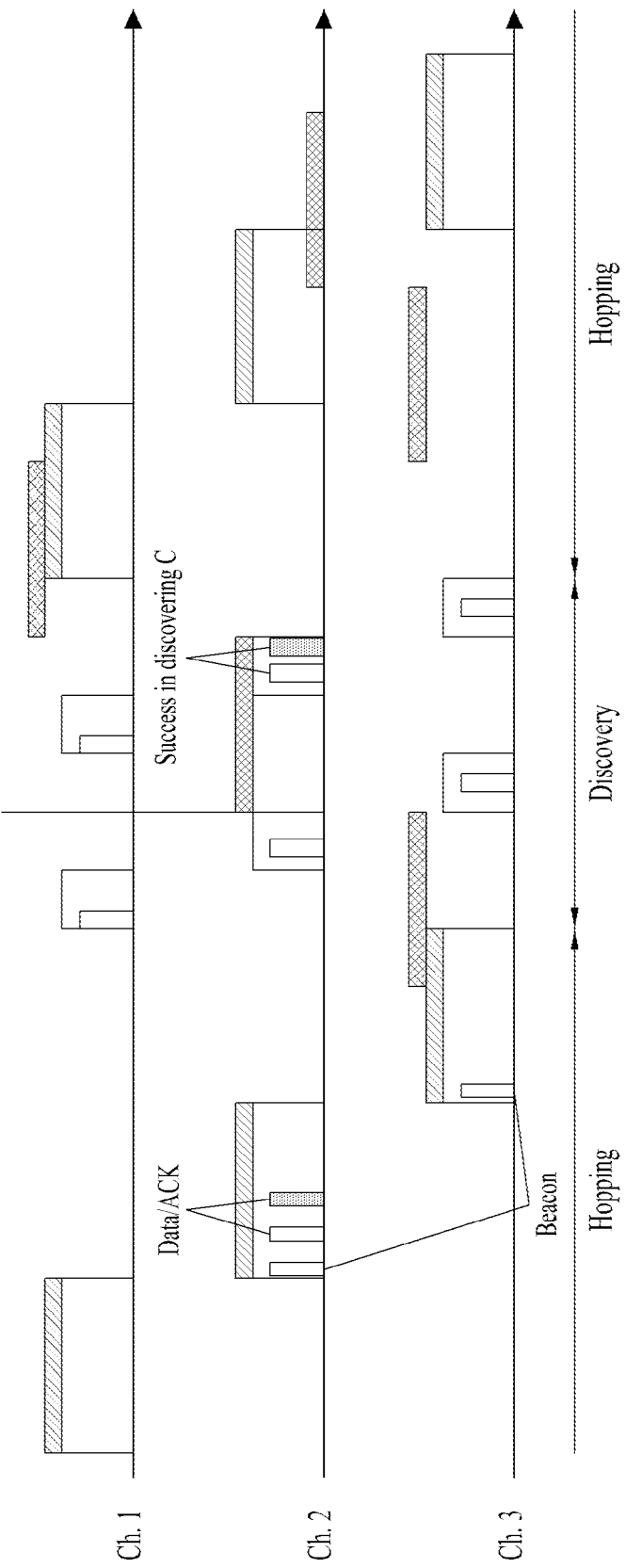

FIGS. 19 to 21 are diagrams of a user equipment discovery period according to one embodiment of the present invention.

Figure 22:
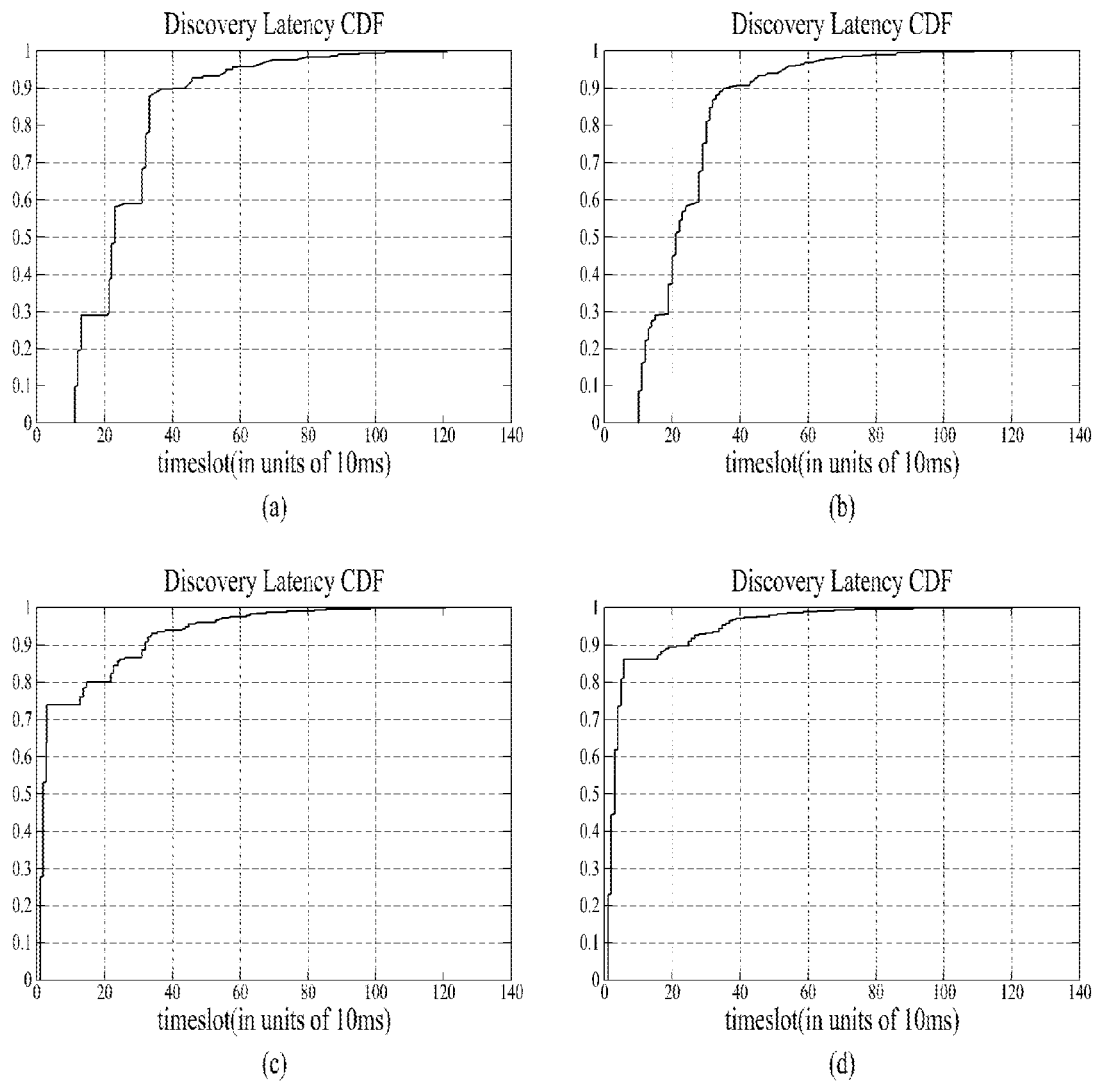

FIG. 22 is a graph to show probability of discovering a user equipment experimentally.

FIGS. 23 to 26 are diagrams of a user equipment discovery process according to another embodiment of the present invention.

FIG. 27 is a diagram for a structure of a beacon frame according to one embodiment of the present invention.

FIG. 28 is a diagram for structure of a connection request frame and a connection response frame.

FIG. 29 is a block diagram for a configuration of a wireless communication device according to one embodiment of the present invention.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details. For instance, although the following descriptions are made in detail on the assumption that a mobile communication system corresponds to 3GPP LTE system, they are applicable to other random mobile communication systems except unique features of the 3GPP LTE system.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Besides, in the following description, assume that a terminal is a common name of such a mobile or fixed user stage device as a user equipment (UE), a mobile station (MS), an advanced mobile station (AMS) and the like. And, it may be used interchangeably with a device. Moreover, assume that a base station is a common name of such a random node of a network stage communicating with a terminal as a Node B, an eNode B, a base station, an access point (AP) and the like.

In a mobile communication system, a user equipment is able to receive information in downlink from a base station. And, the user equipment is able to transmit information in uplink as well. Information transmitted or received by the user equipment includes data and various types of control information. And, various kinds of physical channels exist in accordance with types and usages of the information transmitted or received by the user equipment.

3GPP LTE (3rd generation partnership projecting long term evolution, hereinafter abbreviated LTE) and LTE-Advanced (hereinafter abbreviated LTE-A) communication systems are schematically described for examples of a wireless communication system to which the present invention is applicable.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink and SC-FDMA in uplink. And, LTE-A (LTE-Advanced) is an evolved version of 3GPP LTE.

For clarity of the explanation, although the present invention is described centering on LTE/LTE-A, the technical idea of the present invention may be non-limited to the LTE/LTE-A.

3GPP LTE/LTE-A System to which the Present Invention is Applicable

FIG. 1 is a diagram to describe physical channels used in 3GPP LTE system and a general signal transmission method using the same.

If a power of a user equipment is turned on or the user equipment enters a new cell, the user equipment may perform an initial cell search job for performing synchronization with a base station and the like S101. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel (PBCH) signal from the base station and then obtain intra-cell broadcast information. Meanwhile, the user equipment may receive a downlink reference signal (DL RS) and then check a downlink channel state.

Having completed the initial cell search, the user equipment may receive a physical downlink control channel (PDCCH) and a physical downlink shared control channel (PDSCH) according to the PDCCH information and then obtain detailed system information S102.

Thereafter, the user equipment may perform a random access procedure to complete the access to the base station S103 to S106. To this end, the user equipment may transmit a preamble through a physical random access channel (PRACH) S103 and then receive a response message through PDCCH and PDSCH corresponding to the PDCCH in response to the preamble S104. In case of a contention based random access, the user equipment may perform a contention resolution procedure such as transmission S105 of an additional physical random access channel signal and reception S106 of a PDCCH signal and a PDSCH signal corresponding to the PDCCH signal.

Having performed the above mentioned procedures, the user equipment may perform reception S107 of a PDCCH signal and/or a PDSCH signal and transmission S108 of a physical uplink shared channel (PUSCH) signal and/or a physical uplink control channel (PUCCH) signal as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted through PUCCH by periods. However, in case that both control information and traffic data need to be simultaneously transmitted, the UCI may be transmitted on PUSCH. Moreover, the UCI may be non-periodically transmitted in response to a request/indication made by a network.

FIG. 2 is a diagram for a structure of a radio frame in 3GPP LTE.

In a cellular OFDM radio packet communication system, uplink/downlink data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) shows an example of a structure of a downlink radio frame of type 1. A downlink radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of a cyclic prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel state is unstable (e.g., a user equipment is moving at high speed), it may use the extended CP to further reduce the inter-symbol interference.

In case of using the normal CP, since one slot includes 7 OFDM symbols, one subframe includes 14 OFDM symbols. The first maximum 3 OFDM symbols are assigned to PDCCH (physical downlink control channel) and the rest of the OFDM symbols may be assigned to PDSCH (physical downlink shared channel).

FIG. 2 (b) shows a structure of a downlink radio frame of type 2. A type-2 radio frame includes 2 half frames. Each of the half frame includes 5 subframes and one of the subframes includes 2 slots. Particularly, a special subframe among the 5 subframes includes DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-mentioned structures of the radio frame are exemplary only. And, the number of subframes included in a radio frame, the number of slots included in the subframe and the number of symbols included in the slot may be modified in various ways.

FIG. 3 is a diagram for an example of a resource grid for a single downlink slot.

Referring to FIG. 3, one downlink slot may include a plurality of OFDM symbols in time domain. In particular, one downlink slot exemplarily includes 7 OFDM symbols and one resource block exemplarily includes 12 subcarriers in frequency domain, by which the present invention may be non-limited.

Each element on a resource grid is called a resource element (hereinafter abbreviated RE). One resource block includes 12×7 resource elements. The number NDL of resource blocks included in a downlink slot may depend on a downlink transmission bandwidth. And, the structure of an uplink slot may be identical to that of the downlink slot.

FIG. 4 is a diagram for a structure of a downlink subframe.

Referring to FIG. 4, maximum 3 OFDM symbols situated in a head part of a first slot of one subframe correspond to a control region to which control channels are assigned. The rest of OFDM symbols correspond to a data region to which PDSCH is assigned. Examples of downlink control channels used in 3GPP LTE may include PCFICH (physical control format indicator channel), PDCCH, PHICH (physical hybrid automatic repeat request indicator channel) and the like.

The PCFICH is transmitted in a first OFDM symbol of a subframe and carries information on the number of OFDM symbols used for transmission of control channels within the subframe. The PHICH is a response channel in response to uplink and carries ACK/NACK (acknowledgement/non-acknowledgement) signal for HARQ (hybrid automatic repeat request). Control information carried on PDCCH may be called downlink control information (hereinafter abbreviated DCI). The DCI may include uplink resource allocation information, downlink resource allocation information or an uplink transmission (Tx) power control command for a random user equipment group.

FIG. 5 is a diagram for a structure of an uplink subframe.

Referring to FIG. 5, an uplink subframe may be divided into a control region and a data region in frequency domain. A physical uplink control channel (PUCCH), which carries uplink control information, is assigned to the control region. And, a physical uplink shared channel (PUSCH), which carries user data, is assigned to the data region. In order to maintain single carrier property, one user equipment does not transmit PUCCH and PUSCH simultaneously. An RB pair in a subframe is assigned to PUCCH for one user equipment. RBs belonging to the RB pair may occupy different subcarriers in each of 2 slots. In particular, an RB pair assigned to PUCCH is frequency-hopped on a slot boundary.

Various embodiment of the present invention may be applied to WLAN system described in the following as well as to the above-mentioned LTE or LTE-A system.

Structure of WLAN System

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. A coverage area, in which the STAs included in the BSS maintain communications, may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS may be dynamically changed. In order to obtain the membership in the BSS, the STA may join the BSS using a synchronization process. In order to access all services of the BSS based structure, the STA should be associated with the BSS. This association may be dynamically configured or may include use of DSS (distribution system service).

A direct station-to-station distance in LAN may be limited by PHY performance. This distance limit may be enough for some cases. However, a station-to-station communication in farther distance may be necessary in some cases. In order to support an extended coverage, a distribution system (DS) may be configured.

The DS means a structure in which BSSs are mutually connected to each other. In particular, BSS may exist as an extended type of a component in a network including a plurality of BSSs instead of existing independently.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

An access point (AP) means an entity that enables associated STAs to access a DS via WM and has STA functionality. Via the AP, data transfer between BSS and DS can be performed. Since every AP basically corresponds to STA, it is an addressable entity. It may not be necessary for an address used by AP for communication on WM to be identical to an address used by AP for communication on DSM.

A wireless network having an arbitrary size and complexity can be configured with a DS and BSSs. In IEEE 802.11 system, such a network is called an ESS network. The ESS may correspond to a set of BSSs connected to a single DS. However, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

In IEEE 802.11, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two difference access and security policies are necessary at the same location and the like.

In the following description, non-AP STA can be called a terminal, a wireless transmit/receive unit (WTRU), a user equipment (UE), a mobile station (MS), a mobile terminal, a mobile subscriber station (MSS) or the like. And, the AP includes the concept corresponding to a base station (BS), a Node-B, an evolved Node-B (eNB), a base transceiver system (BTS), a Femto BS or the like in other wireless communication fields.

A link setup process in IEEE 802.11 system is briefly explained in the following description.

In order for an STA to transceive data by setting up a link with a network, the STA should discover a network, perform authentication, establish association, perform an authentication procedure for security, and the like. A link setup process can be named a session initiation process or a session setup process. And, the discovery, authentication, association and security setup steps of the link setup process can be commonly named an association process.

In order to operate in WLAN, the STA can perform a network discovery action. The network discovery action can include a scanning action of the STA. In particular, in order to access the network, the STA should discover a joinable network. The STA needs to identify a compatible network before joining a wireless network. A process for identifying a network existing in a specific area is called a scanning.

The scanning can be categorized into an active scanning or a passive scanning.

In the active scanning, an STA performing a scanning transmits a probe request frame for searching what kind of AP exists nearby while switching channels and then waits for a response to the transmitted probe request frame. A responder transmits a probe response frame in response to the probe request frame to the STA having transmitted the probe request frame. In this case, the responder may include an STA having transmitted a beacon frame last in a BSS of a scanned channel. In the BSS, since an AP transmits the beacon frame, the AP becomes the responder. In IBSS, since each of STAs within the IBSS transmits the beacon frame in turn, the responder is not fixed. For instance, if an STA transmits a probe request frame on channel #1 and then receives a probe response frame on the channel #1, the STA saves BBS related information contained in the received probe response frame and is then able to perform a scanning in the same manner (i.e., transmission of a probe request on channel #2 and reception of a probe response on channel #2) by switching to a next channel (e.g., channel #2).

The scanning action may be performed by the passive scanning scheme. In the passive scanning, an STA performing the scanning waits for a beacon frame while switching channels. The beacon frame is one of management frames in IEEE 802.11 and is periodically transmitted in order to announce an existence of a wireless network and to enable an STA performing a scanning to discover and join the corresponding wireless network. In a BSS, an AP plays a role in transmitting a beacon frame periodically. In an IBSS, each of STAs within the IBSS transmits a beacon frame in turn. If an STA performing a scanning receives a beacon frame, the corresponding STA saves information on a BSS included in the beacon frame and then records beacon frame information on each channel while switching to another channel. Having received the beacon frame, the STA saves BSS related information contained in the received beacon frame and is then able to perform a scanning on a next channel by switching to the next channel.

Comparing an active scanning and a passive scanning to each other, the active scanning is more advantageous than the passive scanning in delay and power consumption.

After the STA has discovered the network, an authentication process can be performed. This authentication process can be named a first authentication process to be clearly discriminated from a security setup action described later.

The authentication process includes a following process. First of all, the STA transmits an authentication request frame to the AP. Secondly, the AP transmits an authentication response frame to the STA in response to the authentication request frame.

The authentication frame used for the authentication request/response corresponds to a management frame and may contain information related to the authentication (e.g., authentication algorithm number, authentication transaction sequence number, status code, challenge text, RSN (robust security network), finite cyclic group, etc.). Based on the information contained in the authentication request frame received from the STA, the AP can determine whether to allow the authentication of the corresponding STA. The AP is able to provide a result of the authentication process to the STA, for example, through an authentication response frame.

After the STA has been successfully authenticated, an association process can be performed. The association process includes a following process. First of all, the STA transmits an association request frame to the AP. Secondly, the AP transmits an association response frame to the STA in response to the association request frame.

For instance, the association request frame can include information related to various capabilities such as a beacon listen interval, a service set identifier (SSID), supported rates, supported channels, an RSN, a mobility domain, supported operating classes, a TIM (traffic indication map) broadcast request, an interworking service capability and the like. For instance, the association response frame can include informations related to various capabilities such as a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS map and the like. The above-mentioned Information corresponds to some example of information containable in the authentication request/response frame and additional information may be further included.

After the STA has been successfully associated with the network, a security setup process can be performed. The security setup process may be called an authentication process through RSNA (robust security network association) request/response.

The security setup process can include a private key setup process by 4-way handshaking through EAPOL (extensible authentication protocol over LAN) for example. And, the security setup process can be performed by a security scheme that is not defined in IEEE 802.11 Standard.

Device-to-Device Communication (D2D)

In a short range communication, a communication between user equipment (i.e., D2D communication) may be generally defined as a peer-to-peer form. These communication subjects reciprocally perform a communication by defining a random access protocol in-between and do not need to consider whether one of the communication subjects is actually connected to a public Internet network.

On the contrary, communication in a cellular network should be defined as communication between a base station and a user equipment or communication between an entity equivalent to a base station and a user equipment. And, the whole communication behaviors are controlled by the base station or the entity equivalent to the base station. Under this protocol, the cellular network restricts behaviors of all user equipment by a predetermined rule, thereby having a structure for obtaining maximum throughput. However, this rule may have over-ruled aspects depending on an application or a channel environment of a user equipment. For instance, a base station determines a power to be consumed for transmission of the same data traffic by a user equipment. And, the base station needs to be placed in the middle even for a short range communication since all behaviors of the user equipment for the transmission of the same data traffic should work under the control of the base station. In order to achieve a short range communication with low power consumption, a user equipment should have a structure of utilizing another radio access technology (RAT) or accept the inconvenience of the cellular network. Since a channel environment of a user equipment is vulnerable, when the user equipment accesses a network, such a structural problem may impose restriction on the user equipment that uses an optimal communication path to search for a new access path.

FIGS. 6 and 7 are diagrams for examples of applying D2D communication.

If a propagation loss between a source user equipment and a base station is considerable or a channel quality is equal to or lower than a predetermined level, D2D communication can be triggered. For instance, referring to FIG. 6 (*a*), when a plurality of user equipments are located in a room, a channel state may be changed depending on a user equipment location. Hence, the source user equipment can improve data throughput through the D2D communication or raise a data reception quality. Moreover, referring to FIG. 6 (*b*), as a source user equipment is located on an alley between tall buildings, although the source user equipment is included in a radio shadow area, if the source user equipment has a good channel state with another nearby user equipment, the source user equipment communicates with the nearby user equipment and the user equipment in a good channel state communicates with a base station. Therefore, it is able to enhance power efficiency and throughput of the user equipment that becomes a source of data traffic. Thus, if a plurality of user equipment exist and are managed, when a server accesses each of the user equipment through a base station, it is able to consider a model that a specific user equipment plays a role as an aggregator for a plurality of the user equipment.

For another instance, referring to FIG. 7, if a user equipment intends to communicate with a nearby user equipment by utilizing an RAT of cellular only without using an RAT different from that of the cellular, a corresponding data exchange is controlled by a base station. However, even if user equipment are located so close to each other, data transceived between the user equipment should be forwarded to the base station and then retransmitted to the targeted user equipment. Thus, such a structure is companied by an unreasonable communication structure. In doing so, if an owner, which manages user equipment performing direct D2D communication, manages the corresponding user equipment in a manner of being located adjacent to the corresponding user equipment, it is preferable that data is directly delivered to a managed user equipment of the corresponding owner rather than forwarded to a base station.

In doing so, comparing the above-mentioned case to a case of using another RAT (e.g., Wi-Fi, Bluetooth, Zigbee, etc.), since a user equipment does not need to include a model for multiple RATs, it is able to configure an inexpensive eco-system. Since the multiple RATs are not used, it is not required to implement a processing configuration for unnecessary application layers. Moreover, if an air-interface for D2D communication and an air-interface for UE-to-BS communication are designed on the single-RAT basis in a combinable manner, it is able to overcome the inefficiency in case that the air-interfaces are independently designed on the multi-RAT basis. In particular, if a short range communication and a cellular network access are allowed by utilizing a single RAT, it is able to configure an eco-system of very efficient D2D devices. These features are applicable to user devices (i.e., human devices) likewise. In doing so, it is able to perform both a short range communication and a long range communication through a device of less complexity with small power. And, it is possible to perform an active QoS (quality of service) management for efficiently maintaining a power consumption level and a throughput management.

In the following description, (direct) D2D communication means a method of performing direct communication between user equipment without using a base station in a situation that a channel state between at least two user equipment is good or user equipment are located adjacent to each other. In doing so, although data is exchanged between the user equipment through the direct communication, the D2D communication associated with the present invention differs from such communication for exchanging data between user equipment without involvement of a base station as bluetooth (BT) communication, infrared ray communication and the like in that prescribed control information for D2D communication is provided by a base station.

The aforementioned direct D2D communication can be used interchangeably with such a terminology as device-to-device (D2D) communication, mobile station-to-mobile station (MS-to-MS, M2M) communication, peer-to-peer (P2P) communication and the like.

Method of Performing D2D Communication

Initial transmission that is performed after allocating resources for D2D communication to D2D user equipment differs from that of a cellular network in that each of the D2D user equipment are aware of the resources for the D2D communication clearly.

In case that D2D communication is performed by sharing resource with an existing cellular network, it may cause a problem that synchronization between a user equipment currently performing cellular network communication and a D2D user equipment currently performing the D2D communication is mismatched or a problem that synchronization between the D2D user equipment currently performing the D2D communication with different D2D user equipment is mismatched. In case of the user equipment currently using the cellular network, although the corresponding user equipment transmits a signal by acquiring synchronization with a base station, since the user equipment currently using the cellular network differs from the D2D user equipment currently performing the D2D communication in delays attributed to paths, inter-carrier interference is caused to the D2D user equipment currently performing the D2D communication due to the mismatch of the synchronization. Hence, a method of preventing performance degradation due to the inter-carrier interference is necessary.

In case of D2D communication, although a D2D user equipment can acquire coarse synchronization mutually using a base station of a cellular network, since the D2D communication differs from the cellular network in path, it may cause a problem that fine synchronization between D2D user equipment performing direct communication with each other is different from synchronization between the D2D user equipment and the base station or synchronization between D2D user equipment currently performing the D2D communication with different D2D user equipment. Besides, it may be difficult to transmit data on a downlink channel structure due to hardware (H/W) limitation of a D2D user equipment in D2D communication. And, it may be preferable that data is transmitted on an uplink channel structure. In this case, a reference signal (or a synchronization signal) for acquiring fine synchronization is required for D2D communication between D2D user equipment performing the D2D communication. In particular, unlike the cellular network, in direct communication unable to avoid restrictions put on transmission powers of transmitting and receiving D2D user equipment to minimize interference with other user equipment, since a process for acquiring synchronization precisely is closely related to data transmission performance, it is very important to set up a reference signal for synchronization.

Channel Hopping

FIG. 8 is a diagram for one example of channel hopping of a user equipment.

Referring to FIG. 8, user's user equipment (hereinafter referred to as user equipment) A establishes sessions with each of user equipment B and user equipment C and communicates with the UE B and the UE C at the same time. Channel 1 is used for D2D communication between the UE A and the UE B and channel 2 is used for D2D communication between the UE A and the UE C. In the present invention, assume IEEE 802.11 system, and more particularly, CSMA-CA (carrier sense multiple access—collision avoidance) in IEEE 802.11 system. In the CSMA-CA system in IEEE 802.11, it is regulated that a user equipment always senses a fixed channel. In other words, in case that the UE A is communicating with the UE B on the channel 1, the UE A is unable to transceive with the UE C.

In a situation that a user equipment is unable to communicate with two user equipment simultaneously, two types of methods can be considered to solve this. As one of the two methods, channels in two sessions (e.g., A-B and A-C in FIG. 8) may be configured identical to each other. In particular, the UE A may make a request for changing a communication channel into the channel 1 to the UE C. And, the UE A may make a request for changing the communication channel into the channel 2 to the UE B, likewise. Moreover, it may possible that the UE makes a request for changing the communication channel into another channel (e.g., channel 3) to both of the UE B and UE C.

If the UE A communicates with a plurality of user equipment on a single channel, the UE A senses only the corresponding channel at all times. However, in this case, communication channels of the UE B and the UE C may not be considered. In particular, the UE C may be placed on a situation that the UE C is unable to use the channel 1. Moreover, in case that a plurality of user equipment (e.g., UE D, UE E, UE F, etc.) including the UE B and UE C are connected to the UE A, if channels are unified into a single channel, it may cause problems of inefficient use of resources and performance degradation.

As another method, the UE A may perform communication by alternately changing the channel 1 and the channel 2. As mentioned in the foregoing description, while operating on a channel, a user equipment is unable to receive data transmitted on a different channel or to transmit data on a different channel. Since the UE B and the UE C may perform communication in a manner of establishing sessions with a plurality of user equipment similar to the UE A, the UE B and the UE C may perform communication by alternately changing a plurality of channel (or according to a predetermined order). Thus, in case that each user equipment performs communication by alternately changing its channels, if information between user equipment are not sufficient, communication on the same channel at a specific time may not be normally performed due to communication disturbance variables. Therefore, it is necessary to define a predetermined rule or standard with respect to an operation performed in a manner of alternately changing channels.

FIG. 9 is a diagram for one example of channel hopping in a D2D communication environment.

Referring to FIG. 9, it is assumed that there are 3 user equipment (user equipment A, B and C) and 4 channels (channels 1, 2, 3 and 4). In FIG. 9, all the user equipment A, B and C perform hopping using the same channel sequence (i.e., ch.1→ch.3→ch.2→ch.4). Since this channel sequence is repeated and the user equipment A, B and C hop to the same channel at the same time, the condition of sensing only a single channel, which is assumed in IEEE 802.11 CSMA-CA system, is satisfied. Therefore, each of the user equipment A, B and C may transceive data with a desired user equipment. A user equipment that starts the operation initially configures its channel sequence (i.e., hopping sequence) and then provides information on the configured channel sequence to different user equipment located nearby. The different user equipment configure their own channel sequences based on the information and establish sessions with desired user equipment. If the sessions are established, the user equipment may be aware of an operating channel and an operating time of each of the user equipment by exchanging their channel sequence information with each other.

FIG. 10 is a diagram for one example of D2D communication.

As a method for D2D communication, in a method for a $1^{st}$ user equipment operating according to a $1^{st}$ channel sequence to establish a new session with a $2^{nd}$ user equipment operating according to a $2^{nd}$ channel sequence, a method of configuring a channel sequence is described.

First of all, a $1^{st}$ user equipment receives a D2D communication request message from a $2^{nd}$ user equipment. If the $1^{st}$ user equipment desires to communicate with the $2^{nd}$ user equipment, the $1^{st}$ user equipment may transmit a request acceptance message to the $2^{nd}$ user equipment. If the $1^{st}$ user equipment does not accept the communication request from the $2^{nd}$ user equipment, D2D communication may be deferred until another request is made.

The $1^{st}$ user equipment may transmit a $1^{st}$ channel hopping sequence corresponding to its channel hopping sequence to the $2^{nd}$ user equipment. Subsequently, the $1^{st}$ user equipment receives $2^{nd}$ channel hopping sequence information from the $2^{nd}$ user equipment and may then determine a $3^{rd}$ channel hopping sequence based on the $1^{st}$ channel hopping sequence information and the $2^{nd}$ channel hopping sequence information. In this case, the $3^{rd}$ channel hopping sequence information includes channel information on communication with a user equipment of which a session is connected with the $1^{st}$ user equipment and time interval information of the communication with the user equipment of which the session is connected with the $1^{st}$ user equipment. In other words, the $3^{rd}$ channel hopping sequence information may include information indicating an operating period of the $1^{st}$ user equipment and information indicating how to perform hopping in the period.

It is assumed in FIG. 10 that user equipment A, B and C perform hopping using the same channel hopping sequence (i.e., ch.1→ch.3→ch.2→ch.4) as mentioned in the forgoing description with reference to FIG. 9. Thus, since communication between the UE A and the UE B (i.e. A-B), communication between the UE A and the UE C (i.e., A-C), and communication between the UE B and the UE C (i.e., B-C) can be performed on the same channel in the same time interval, the user equipment A, B and C may transceive data with each other. However, it should be noted that a single user equipment has limitations in transceiving data with at least two user equipment at the same time according to the CSMA-CA system.

In FIG. 10, the user equipment A, B and C perform hopping using the predetermined channel sequence. In this case, if a new user equipment D intends to perform D2D communication with the user equipment C, a problem may be caused. In particular, in aspect of the user equipment C, the user equipment C performs communication by repeating operations using the predetermined channel hopping sequence (i.e., ch.1→ch.3→ch.2→ch.4) as a period. In doing so, if the user equipment C receives a communication request from the user equipment D, the user equipment C needs to change a configuration of the channel hopping sequence into a channel hopping sequence that enables the user equipment C to communicate with all of the user equipment A and B, which perform existing D2D communication, and the new user equipment D in order to communicate with the new user equipment D. As shown in FIG. 10, one period is divided into 4 time intervals. The user equipment communicates with each other on ch.1 in a $1^{st}$ time interval, on ch.3 in a $2^{nd}$ time interval, on ch.2 in a $3^{rd}$ time interval, and on ch.4 in a $4^{th}$ time interval. In this case, in order to add D2D communication with the user equipment D, the user equipment C should be aware of channel hopping sequence information of the user equipment D. The user equipment D may transmit a message for requesting the D2D communication to the user equipment C. When the user equipment C accepts the communication request from the user equipment D, the user equipment C may transmit a message containing the channel hopping sequence information of the user equipment C to the user equipment D. The reason for transmitting the message containing the channel hopping sequence is that the user equipment D refers to the channel hopping sequence information to configure a new channel hopping sequence by exchanging the current channel hopping sequence information of the user equipment C with the user equipment D. The user equipment D may receive the channel hopping sequence information of the user equipment C from the user equipment C and then transmit the channel hopping sequence of the user equipment D to the user equipment C. In this case, it may be understood from the channel hopping sequence that the user equipment D operates on ch.3 in the $1^{st}$ time interval, on ch.2 in the $2^{nd}$ time interval, on ch.3 in the $3^{rd}$ time interval, and on ch.2 in the $4^{th}$ time interval. This may correspond to half of the period of the user equipment C. Moreover, it may be understood that the user equipment D operates by alternately changing ch.3 and ch.2 (i.e. ch.2→ch.3→ch.2→ch.3). Thus, the user equipment C is able to understand that the user equipment C may not communicate with the user equipment D using the existing channel hopping sequence and may then determine the new channel hopping sequence. In this case, for example, the user equipment may configure the channel hopping sequence so as to communicate with the user equipment D in the $2^{nd}$ and $4^{th}$ time intervals in a manner of matching the $2^{nd}$ and $4^{th}$ time intervals with those of the user equipment D. In this case, the user equipment C may communicate with the user equipment A and B in some time intervals in order to communicate with the user equipment D. The user equipment C may determine the channel hopping sequence to communicate with the user equipment A and B in the $1^{st}$ time interval, to communicate with the user equipment D in the $2^{nd}$ time interval, not to communicate with any user equipment in the $3^{rd}$ time interval (however, the user equipment A and B communicate with each other in the $3^{rd}$ time interval), and to communicate with the user equipment D in the $4^{th}$ time interval (i.e., ch.1→ch.2→ch.1→ch.2). In this case, it is just exemplary that the UE C keeps the $3^{rd}$ time interval in the entire period vacant. Moreover, since the user equipment C may configure the channel hopping sequence so as to communicate with one of the user equipment A, B and D in the $3^{rd}$ time interval as well, it may not cause a problem of performance degradation. Furthermore, in case that the $3^{rd}$ time interval may be remained vacant for the purpose of a channel for D2D communication with a different user equipment, utilization of the vacant $3^{rd}$ time interval may be variously configured.

A basic assumption in FIG. 10 may be set different. In particular, on the premise that the user equipment C and D are communicating with each other, a case that the user equipment C intends to perform new D2D communication with user equipment A and B may be considered. For instance, it may correspond to a situation that the user equipment C intends to run a game supportive of triangular D2D communication while transceiving data with the user equipment D. In this case, the above-mentioned description can be applied in the same manner. In particular, the user equipment C communicates with the user equipment D in order of ch.3→ch.2→ch.3→ch.2. In this case, the user equipment C may transmit a new D2D communication request message to the user equipment A and B and the user equipment A and B may determine whether to accept the new D2D communication request. If D2D communication between multiple D2D users i.e., the user equipment A, B and C is granted, the user equipment C may transmit its channel hopping sequence information to the user equipment A and B. This channel hopping sequence information may include information on time intervals in the period and channels used by the user equipment C to communicate with the user equipment D before new communication. Based on the channel hopping sequence information of the user equipment C, the user equipment A and B may change channel hopping sequence by determining channel hopping sequence for operations in new communication. The user equipment A and B may transmit the changed channel hopping sequence to the user equipment C. Having received it, the user equipment C may change its channel hopping sequence by reflecting the changed channel hopping sequence of the user equipment A and B on its channel hopping sequence. In case that the channel sequence of the user equipment C is changed by the user equipment A and B, the user equipment C may transmit its changed channel hopping sequence to the user equipment D that maintains the existing communication and then communicate with the user equipment D based on the changed channel hopping sequence.

FIG. 11 is a diagram for another example of D2D communication.

Referring to FIG. 11, it is assumed that user equipment A, B and C perform D2D communication using ch.1 in a $1^{st}$ time interval of a predetermined period. Similar to FIG. 9, assume that three user equipment operate using the channel sequence in order of ch.1→ch.3→ch.2→ch.4. In doing so, the user equipment A intends to connect a session with a new user equipment and the user equipment B and C intend to connect sessions with new user equipment, respectively. Channel hopping sequences of the user equipment connected to the user equipment A, B and C are different from each other (of course, they may be identical to each other). As mentioned in the foregoing description, three user equipment may determine new channel hopping sequences by exchanging their channel hopping sequence information with the channel hopping sequence information of the new user equipment respectively and then operate using the determined channel hopping sequences. FIG. 11 shows an example that all of the three user equipment operate using the changed channel hopping sequences respectively. Referring to channel hopping sequences in one period of the three user equipment, it may be known that the user equipment A has a channel hopping sequence in order of ch.1→ch.3→ch.2→ch.4 (i.e., the channel hopping sequence of the user equipment A is not changed), the user equipment B has a channel hopping sequence in order of ch.1→ch.4→ch.3→ch.2, and the user equipment C has a channel hopping sequence in order of ch.1→ch.2→ch.1→ch.3.

FIG. 12 is a diagram for another example of D2D communication.

Referring to FIG. 12, assume that a user equipment A performs D2D communication with user equipment B and C with a predetermined period. Although a case that user equipment A, B and C perform D2D communication between multiple D2D user equipment is described with reference to FIG. 11, a case that the user equipment A establishes one session for D2D communication session with the user equipment B and another session for D2D communication with the user equipment C is described with reference to FIG. 12. In case that one user equipment intends to add a D2D communication with a new user equipment while performing a plurality of D2D communications, a channel hopping sequence may be determined in the same manner as mentioned in the foregoing description. In particular, the UE A communicates with the UE B in a $1^{st}$ time interval of the period using ch.1 and in a $3^{rd}$ time interval using ch.2. And, the UE A communicates with the UE C in a $2^{nd}$ time interval of the period using ch.3 and in a $4^{th}$ time interval using ch.4. In this case, the UE B and the UE C may add D2D communication with new UEs except the D2D communication with the UE A, respectively. As mentioned in the foregoing description, each of the UE B and the UE C may change channel hopping sequence in a manner of exchanging its existing channel hopping sequence information with the new UE. If the channel hopping sequence is changed, each of the UE B and the UE C may maintain the communication with the UE A by transmitting the changed channel hopping sequence to the UE A corresponding to a target of the existing D2D communication.

Synchronization of D2D Communication

FIGS. 13 and 14 are diagrams for other examples of D2D communication in the present invention.

FIG. 13 shows a case that user equipment fails in matching synchronization of channel hopping sequences with each other. In the situation assumed in FIG. 10, channel hopping sequences of user equipment A, B and C are focused but channel synchronization is not considered. Each of the user equipment is able to perform its own D2D communication and to have different channel synchronization. Thus, while user equipment A, B and C are communicating with each other, if a new user equipment D intends to add a session with the user equipment C, the user equipment C should determine whether to accept synchronization of existing communication channels (channel synchronization between the UE A and the UE B has been matched), to accept synchronization with a channel of a target user equipment in newly added D2D communication, or to configure new synchronization.

In aspect of the UE C that intends to add new D2D communication, if synchronization between an existing communication session and a new communication session is not matched, it has high probability of preventing efficient communication and wasting resources. For instance, in the drawing, the UE C communicates with the UE A and the UE B on ch.1 in a $1^{st}$ time interval. However, unlike the UE A and the UE B, the UE C may fail in communicating with the UE A and the UE B due to initial channel control time. In particular, a considerably short time interval is assigned to the UE C as communication time with the UE A and the UE B in a time interval in which the UE C hops to ch.3 Hence, if the channel synchronization mismatch is applied to user equipment connecting communication with user equipment A to D as well as user equipment A to D, efficient communication may not be performed due to complex sequence.

FIG. 14 shows a case that user equipment fails in matching synchronization of channel hopping sequences with each other. Since it is assumed in FIG. 13 that user equipment A, B and C has performed communication with each other, the user equipment C should determine whether to accept the existing channel synchronization or the channel synchronization with the new user equipment in the situation that synchronization is completed. Hereinafter, described is a synchronization problem, which may occur if the user equipment A, B and C intend to communicate with each other while each of the user equipment A, B and C performs D2D communication with a different user equipment.

Since a user equipment operates with its own channel hopping sequence and channel synchronization, the user equipment should change the channel hopping sequence and match the channel synchronization in order to communicate with a new user equipment. In case of the channel hopping sequence, the user equipment may change its channel hopping sequence to communicate with all user equipment connected to the corresponding user equipment. In other words, the user equipment determines its channel hopping sequence and then hops to the determined channel at a prescribed time. However, the synchronization differs from the channel hopping sequence. In the course of generating a channel, the channel synchronization should be determined based on channel synchronization of a specific user equipment among communicating user equipment or new channel synchronization should be configured. Therefore, it needs to consider channel synchronization of a different user equipment. Currently, specific standards or norms for channel synchronization between user equipment performing channel hopping in D2D communication have not been adopted so it is required to set specific standards for the channel synchronization.

Hereinafter, in synchronization between user equipment performing D2D communication, a method of determining channel synchronization reference user equipment is described. Since at least two user equipment exist in the channel synchronization, channel synchronization of each of the two user equipment should be satisfied. Moreover, if one of the two user equipment maintains another communication session, since the channel synchronization may be accompanied with additional synchronization processes such as 1-hop, 2-hop and the like, it is not just a problem between the two user equipment.

Channel Synchronization Reference User Equipment

In the following description, in case that two user equipment operate with respective channel synchronizations, a method of determining one of the two user equipment as a channel synchronization reference user equipment is described.

FIG. 15 is a diagram for one example of a channel synchronization process.

Two user equipment that perform D2D (device-to-device) communication has respective channel hopping sequences. The two user equipment may operate by hopping on a plurality of channels or may communicate with each other on a single channel. Since a new communication session needs to be established between the above-mentioned user equipment, it is considerably difficult to satisfy all of the existing channel hopping sequences of the two user equipment. Therefore, the two user equipment determine to change channel hopping sequences to satisfy both an existing connected user equipment and a newly connected user equipment and can operate using the changed channel hopping sequences S1510.

Having determined channel hopping sequences for next operations, the two user equipment may negotiate that one of the two user equipment is determined as a channel synchronization reference user equipment for channel synchronization S1520. If the channel synchronization user equipment is determined through a series of process, the channel synchronization may be performed in a manner of matching channel synchronization of the reference user equipment S1530.

FIG. 16 is a flowchart for one example of a channel synchronization process.

Referring to FIG. 16, two user equipment may determine a channel synchronization reference user equipment by exchanging messages with each other. First of all, a $1^{st}$ user equipment operating according to a $1^{st}$ channel hopping sequence transmits a sync request message to a $2^{nd}$ user equipment operating according to a $2^{nd}$ channel hopping sequence S1610. In case of new D2D communication, it is preferable that a user equipment that discovers another user equipment transmits the sync request message first but the sync request message may be transmitted based on different standards. For instance, in case that the $1^{st}$ user equipment discovers the $2^{nd}$ user equipment first and then makes a request of D2D communication to the $2^{nd}$ user equipment, if the $2^{nd}$ user equipment accepts the request from the $1^{st}$ user equipment, the $2^{nd}$ user equipment may transmit the sync request message in response to the request.

The sync request message may include channel hopping sequence information of the $1^{st}$ user equipment. And, the sync request message may further include channel synchronization information of the $1^{st}$ user equipment. The reason for this is that before starting communication between the two user equipment, completion of channel hopping sequence determination and synchronization may be useful in aspect of efficient resource management for later communication. As mentioned in the foregoing description, the $1^{st}$ user equipment may transmit its channel hopping sequence information (e.g., ch.1→ch.3→ch.2→ch.4) to the $2^{nd}$ user equipment. By receiving the channel hopping sequence information of the $1^{st}$ user equipment, the $2^{nd}$ user equipment may determine a time interval and a channel that are used for communication with the $1^{st}$ user equipment.

Having received the sync request message from the $1^{st}$ user equipment, the $2^{nd}$ user equipment may determine the channel synchronization reference user equipment using a predetermined algorithm in order to match synchronization with the $1^{st}$ user equipment. If the channel synchronization reference user equipment is determined through the predetermined algorithm, the $2^{nd}$ user equipment a sync response message containing information on the determined channel synchronization reference user equipment to the $1^{st}$ user equipment S1620. In this case, the sync response message may include channel hopping sequence information of the $2^{nd}$ user equipment (similar to changing channel hopping sequence of the $1^{st}$ user equipment, channel hopping sequence of the $2^{nd}$ user equipment may be changed), channel synchronization information of the $2^{nd}$ user equipment, and information indicating which user equipment corresponds to the channel synchronization reference user equipment. Having received the sync response message from the $2^{nd}$ user equipment, the $1^{st}$ user equipment may obtain various types of information through the sync response message. In particular, the $1^{st}$ user equipment may change its channel hopping sequence based on the channel hopping sequence information of the $2^{nd}$ user equipment. For instance, if the channel hopping sequence of the $1^{st}$ user equipment is ch.1→ch.3→ch.2→ch.4 and that of the $2^{nd}$ user equipment is ch.3→ch.2→ch.3→ch.2, the $1^{st}$ user equipment may operate according to a $3^{rd}$ channel hopping sequence in a manner of changing its channel hopping sequence into ch.1→ch.2→ch.1→ch.2.

Through the sync response message, the $1^{st}$ user equipment can be aware of which user equipment corresponds to the channel synchronization reference user equipment between the two user equipment. Both of the $1^{st}$ and $2^{nd}$ user equipment saves the predetermined algorithm and may determine the channel synchronization reference user equipment irrespective of which user equipment receives the sync request message.

Before the two user equipment, which have checked which user equipment is the channel synchronization reference user equipment, actually perform communication between each other, the $1^{st}$ user equipment may transmit a sync confirm message for confirm the channel synchronization reference user equipment once again to the $2^{nd}$ user equipment S1630. The reason for transmitting the sync confirm message after determining the reference user equipment is that the $2^{nd}$ user equipment is allowed to reject to become the channel synchronization reference user equipment in consideration of a channel environment of the $2^{nd}$ user equipment even if the $2^{nd}$ user equipment is determined as the channel synchronization reference user equipment using the predetermined algorithm. In case that the $1^{st}$ user equipment is determined as the channel synchronization reference user equipment, the $2^{nd}$ user equipment is unable to change the decision since the $2^{nd}$ user equipment is not aware of a channel environment of the $1^{st}$ user equipment entirely. However, in case that the $2^{nd}$ user equipment is determined as the channel synchronization reference user equipment, if the $2^{nd}$ user equipment has insufficient hardware/software for operating as the channel synchronization reference user equipment, the $2^{nd}$ user equipment may transmit a message so that the $1^{st}$ user equipment becomes the channel synchronization reference user equipment. Therefore, synchronization between the two user equipment may be performed in a manner of finally confirming which user equipment is the channel synchronization reference user equipment through the sync confirm message and transmitting time information indicating a time at which the synchronization is performed. Having exchanged the sync confirm message with each other, the two user equipment may have a prescribed amount of a sync delay time and then match synchronization with each other after the elapse of the sync delay time, thereby operating based on the changed channel sequences.

Algorithm for Determining Channel Synchronization Reference User Equipment

In the following description, the above-mentioned algorithm for determining the channel synchronization reference user equipment is explained.

Preferably, a method of determining a receiving side user equipment receiving a sync request message as the channel synchronization reference user equipment may be considered. In performing new D2D communication, if a user equipment requesting D2D communication accepts synchronization of a user equipment receiving a request message, it may not affect the channel synchronization of the receiving side user equipment. In this case, it has an advantage in that the user equipment receiving a sync request may not have a significant burden in the operation of the channel synchronization. It is because the receiving side user equipment considers only a channel hopping sequence for communication with a newly connected user equipment.

If the user equipment receiving the sync request message becomes the channel synchronization reference user equipment, there is no significant difficulty in performing channel synchronization between two user equipment simply. However, in case of a user equipment communicating with an existing user equipment except a new user equipment, a change in channel synchronization may derivatively cause problems in 1-hop and 2-hop user equipment. For instance, if UE A and UE B perform existing communication with each other, while the UE A transmits a sync request message to UE C to perform new D2D communication with the UE C, the UE C corresponding to the receiving side UE becomes the channel synchronization reference user equipment according to the algorithm. In case that the UE A matches its synchronization with that of the UE C, it may cause a problem in channel synchronization of 1-hop UE, which corresponds to the UE B communicating with the UE A. Moreover, in case that the UE B matches its synchronization with that of the UE A, it may require a series of operations i.e., 2-hop UE of the UE A, which corresponds to 1-hop UE of the UE B, should perform synchronization again. Therefore, it may be preferable to determine the receiving side user equipment receiving the sync request message as the channel synchronization reference user equipment basically and, if the above decision is not appropriate for the communication environment, to apply a different standard.

Alternatively, among two user equipment that intend to perform new D2D communication, a user equipment having the large number of connected communication sessions may be determined as the channel synchronization reference user equipment. This is because, in a series of synchronization operations after performing synchronization, performing the small number of synchronization operations is more efficient. For instance, if UE A performs two D2D communications such as D2D communication between the UE A and UE B (i.e., A-B) and D2D communication between the UE A and UE C (i.e., A-C), while UE D, which is a target UE of new D2D communication, performs equal to or smaller than one existing communication, it is efficient that the UE D matches its synchronization with that of UE A in a manner of determining the UE A as the channel synchronization reference user equipment. On the contrary, if the UE D performs three communications with UE E, UE F and UE G, it is efficient that the UE A matches its synchronization with that of the UE D in a manner of determining the UE D as the channel synchronization reference user equipment.

Standards are also required in determining the number of communication sessions connected to a user equipment. First of all, there is a method of limiting the number of communication sessions connected to the user equipment to that of D2D communications. The user equipment may simultaneously perform various types of communications besides the D2D communication. However, by limiting the number of communication sessions connected to the user equipment to that of the D2D communication, the number of communication sessions connected to the user equipment can be accurately determined.

In determining the number of the connected communication sessions, it may be limited to user equipment within a predetermined hop number of a user equipment. Since a user equipment performing D2D communication may communicate with another user equipment, if channel synchronization is changed, additional processes for changing channel synchronization may follow sequentially. Therefore, determining the number of communication sessions connected to the user equipment with reference to the predefined hop number such as 1-hop or 2-hop may be set as one standard.

In channel synchronization information of user equipment, a user equipment having oldest channel synchronization information may be determined as the channel synchronization reference user equipment. In particular, a user equipment may perform a plurality of D2D communications. And, if two user equipment perform D2D communication with each other, it may be known that one of them which has older channel synchronization information may have more connected user equipment having the same synchronization. Therefore, based on a time of generation of channel synchronization information, the channel synchronization reference user equipment may be determined.

Moreover, the number of hops form the user equipment having the oldest channel synchronization information may set as one standard. In this case, it may be preferable that a user equipment having the smallest number of hops is determined as the channel synchronization reference user equipment. In other words, the user equipment having the smallest number of hops from the user equipment having the oldest channel synchronization information may be interpreted as that the user equipment having the smallest number of hops also has considerably old channel synchronization information. Therefore, it may have more user equipment having the same synchronization.

The above-mentioned standards have one thing in common. In particular, by maximally reducing additional chain synchronization, they try to provide stabilization of synchronization of whole user equipment. Thus, except the above-mentioned standards, it may be preferable to determine the channel synchronization reference user equipment so that the synchronization of the whole user equipment is stabilized.

FIG. 17 is a flowchart for another example of a channel synchronization process.

FIG. 17 illustrates a case that $1^{st}$, $2^{nd}$, $3^{rd}$ user equipment simultaneously transmit sync request messages. Simultaneous channel synchronization between a plurality of user equipment has complex processes compared to synchronization between two user equipment. First, the $1^{st}$ user equipment that intends to perform D2D communications with the $2^{nd}$ user equipment and $3^{rd}$ user equipment may transmit sync request messages to the $2^{nd}$ user equipment and the $3^{rd}$ user equipment, respectively S1710. In this case, the sync request message may include channel hopping sequence information of the $1^{st}$ user equipment and channel synchronization information of the $1^{st}$ user equipment. Having received the sync request message, the $2^{nd}$ user equipment may transmit a sync response message to the $1^{st}$ user equipment. In this case, the $2^{nd}$ user equipment determines a channel synchronization reference user equipment using algorithm having the predetermined standard mentioned in the foregoing description and may then transmit the sync response message by including channel synchronization reference user equipment information S1720. For instance, since the $2^{nd}$ user equipment, which has received the sync request message, corresponds to a receiving side user equipment, the $2^{nd}$ user equipment may be determined as the channel synchronization reference user equipment in D2D communication and this may be transmitted to the $1^{st}$ user equipment. In this case, the sync response message may include channel hopping sequence information of the $2^{nd}$ user equipment and channel synchronization information of the $2^{nd}$ user equipment. By receiving the sync response message from the $2^{nd}$ user equipment, the $1^{st}$ user equipment may know that the $2^{nd}$ user equipment is the channel synchronization reference user equipment (in case that the $2^{nd}$ user equipment rejects to become the channel synchronization reference user equipment, the $1^{st}$ user equipment may know that the $1^{st}$ user equipment becomes the channel synchronization reference user equipment). Therefore, the $1^{st}$ user equipment may transmit a sync confirm message, which contains that the $2^{nd}$ user equipment is the channel synchronization reference user equipment and that synchronization is performed at a predetermined time, to the $2^{nd}$ user equipment again S1730. Since the above process corresponds to the synchronization between two user equipment, it is identical to the process mentioned in the foregoing description.

In the situation of knowing that the $2^{nd}$ user equipment is determined as the channel synchronization reference user equipment, the 1 user equipment may receive a sync response message from the $3^{rd}$ user equipment S1740. The sync response message of the $3^{rd}$ user equipment may include information on the channel synchronization reference user equipment between the $1^{st}$ user equipment and the $3^{rd}$ user equipment and further include channel hopping sequence information and channel synchronization information of the $3^{rd}$ user equipment. Similar to the above example, the $3^{rd}$ user equipment, which receives the sync request message, corresponding to the receiving side user equipment may be determined as the channel synchronization reference user equipment. In this case, since the aforementioned synchronization process may become useless if the $1^{st}$ user equipment accepts channel synchronization of the $3^{rd}$ user equipment, the $1^{st}$ user equipment may transmit a sync confirm message including information indicating that the $1^{st}$ user equipment accepts channel synchronization of the $2^{nd}$ user equipment to the $3^{rd}$ user equipment S1750. Channel synchronization between the $1^{st}$, $2^{nd}$ and $3^{rd}$ user equipment may be performed in a manner that the $3^{rd}$ user equipment, which has received the sync confirm message of the $1^{st}$ user equipment, accepts channel synchronization of the $1^{st}$ user equipment.

However, the $1^{st}$ user equipment may not transmit information indicating that the $1^{st}$ user equipment accepts the channel synchronization of the $2^{nd}$ user equipment to the $3^{rd}$ user equipment. In particular, the $1^{st}$ user equipment has been aware of channel hopping sequence information and channel synchronization information of each of the $2^{nd}$ and $3^{rd}$ user equipment. Based on the information, if determining that it is more efficient to determine the $3^{rd}$ user equipment as the channel synchronization reference user equipment, the $1^{st}$ user equipment may accept the channel synchronization of the $3^{rd}$ user equipment. In this case, channel synchronization may be performed in a manner that the $1^{st}$ user equipment additionally transmits the sync confirm message for indicating that the $1^{st}$ user equipment accepts the channel synchronization of the $3^{rd}$ user equipment to the $2^{nd}$ user equipment.

Hereinafter, before describing the above channel synchronization between user equipment, a process for a user equipment to discover a target user equipment for D2D communication is explained.

FIG. 18 is a flowchart of a user equipment discovery process according to one embodiment of the present invention.

As shown in FIG. 18, it will be described on the premise that D2D communication is not performed at first due to initial power-on of a user equipment or configurations such as initialization and the like.

A user equipment (i.e., $1^{st}$ user equipment) may transmit a probe request frame to discover a target user equipment for D2D communication. Alternatively, the user equipment may discover the target user equipment for the D2D communication by transmitting separate information. In this case, the user equipment may transmit (unicast or multicast) the probe request frame to at least one specific user equipment. Alternatively, the user equipment may transmit (broadcast) the probe request frame to random user equipment.

The user equipment may receive a probe response frame from a different user equipment in response to the probe request frame transmitted by the user equipment. The user equipment may receive at least one of probe response frames and save the probe response frames as a type of list. The user equipment may discover the target user equipment based on the received probe response frame S1810.

The user equipment may select a user equipment for performing D2D communication from the discovered target user equipment S1820. It is possible to select a single user equipment or a plurality of user equipment. In case that a plurality of the user equipment are selected, the user equipment may attempt session connection simultaneously or sequentially.

For D2D communication with the selected user equipment, the user equipment may match synchronization S1830. Since the user equipment operates in a communication environment different from that of the selected user equipment, one common communication environment may be configured for D2D communication. In this case, as mentioned in the foregoing description, channel hopping sequence of each of the user equipment may be determined and synchronization may be matched between the user equipment.

The user equipment may connect a session with the target user equipment S1840. The user equipment transmits a connection request frame to the target user equipment and receives a connection response frame in response to the connection request frame. Thus, control information of D2D communication may be configured and exchanged between user equipment.

After connecting the communication session with the target user equipment, the user equipment may perform D2D communication S1850. A connecting method may be similar to a conventional association process in IEEE 802.11. In this case, the user equipment and the target user equipment may transceive data with each other by performing channel hopping. Having received data, the user equipment may respond whether the user equipment properly receives data using an ACK or NACK signal.

The user equipment performing D2D communication may perform a process for discovering a new user equipment as necessary or in accordance with preset configuration information and the like. Having discovered the new user equipment (i.e., $2^{nd}$ user equipment), the user equipment may match synchronization (re-synchronization) with the new user equipment and connect a communication session in order to perform new D2D communication.

FIG. 19 is a diagram of a user equipment discovery process according to one embodiment of the present invention.

Referring to FIG. 19, a time (i.e., entire discovery period or discovery period) for performing an operation, which is performed by a user equipment to discover a target user equipment for D2D communication, may be sorted into a time interval (hereinafter referred to as hopping time interval) for transmitting data while hopping on channels and a time interval (hereinafter, discovery time interval) for hopping on channels in order to discover a target user equipment.

A user equipment discovery method proposed in the present invention relates to a process for a user equipment, which operates by performing channel hopping according to its channel hopping sequence, to discover a target user equipment for D2D communication. The user equipment (i.e., $1^{st}$ user equipment), which intends to discover the target user equipment, operates based on the channel hopping sequence of the $1^{st}$ user equipment. In doing so, the user equipment may communicate with another user equipment or perform channel hopping without communication with another user equipment. For clarity of the present invention, the following description will be given with respect to a case that the $1^{st}$ user equipment performs D2D communication by being connected with another user equipment in advance.

During the hopping time interval, the $1^{st}$ user equipment operates based on its channel hopping sequence (i.e., $1^{st}$ channel hopping sequence). For instance, the $1^{st}$ user equipment may operate in order of ch.1→ch.2→ch.3. It is also possible for the 1$^{st}$ user equipment to operate by repeating channel hopping sequence by n times (where, n is an integer equal to or greater than 2). The hopping time interval may be composed of same time intervals for each channel. For instance, the user equipment may operate on ch.1 for time T and on each of ch.2 and ch.3 for time T.

During the discovery time interval, the 1$^{st}$ user equipment operates based on its channel hopping sequence (i.e., 2$^{nd}$ channel hopping sequence). In this case, the channel hopping sequence during the discovery time interval may be identical to that during the hopping time interval or they may be different from each other as necessary or in accordance with a configuration (e.g., ch.2→ch.3→ch.1).

A time interval for which the 1$^{st}$ user equipment stays on one channel during the hopping time interval may be configured equal to a channel hopping period for which the 1$^{st}$ user equipment perform hopping on whole channels during the discovery time interval. In particular, an entire discovery period (discovery period) may be sorted into a 1$^{st}$ channel hopping period in the hopping time interval and a 2$^{nd}$ channel hopping period in the discovery time interval. When one time interval within the 1$^{st}$ channel hopping period i.e., a time for which the 1$^{st}$ user equipment stays on one channel amounts to time T, a period for which the 1$^{st}$ user equipment performs hopping on the whole channels during the discovery time interval may amount to time T. Referring to FIG. 19, the 1$^{st}$ user equipment may operates by hopping on 3 channels and stay on each of ch.1 to ch.3 for time T. Although the 1$^{st}$ user equipment hops on ch.1 to ch.3 during the discovery time interval, a time for which the 1$^{st}$ user equipment stays on each channel does not amount to time T. Instead, a time for which the 1$^{st}$ user equipment performs hopping on the whole channels may be configured to be time T. Therefore, the time for staying on one channel during the discovery time interval may correspond to a time obtained by dividing entire time by the number of channels. For instance, a time for which the 1$^{st}$ user equipment stays on one channel in the discovery time interval may be T/3 time.

As mentioned in the foregoing description, the reason for configuring the time for staying on one channel during the hopping time interval equal to the 2$^{nd}$ channel hopping period of the discovery time interval is described. The number of channels on which the 1$^{st}$ user equipment performs hopping may vary depending on a communication environment and the 1$^{st}$ channel hopping sequence in the hopping time interval may be vary depending on the communication environment. Thus, in case that the time for staying on each channel during the hopping time interval is set to a prescribed time T, if synchronization is matched with a newly connected user equipment, it may operate using the same time T for later channel hopping. Hence, it is advantageous in that a process for matching synchronization additionally can be omitted.

Moreover, in case that the discovery time interval is set to time T, i.e., equal to the time for staying one channel during the hopping time interval, despite of repeating the channel hopping sequence by n times during the discovery time interval, the entire discovery period (discovery period) corresponds to a multiple of T at all time. Thus, it is advantageous in that synchronization is able to be matched through only one synchronization process. The 1$^{st}$ user equipment may repeat the 1$^{st}$ channel hopping sequence in the hopping time interval and the 2$^{nd}$ channel hopping sequence in the discovery time interval. Since both of the hopping time interval and the discovery time interval are multiples of time T, the entire discovery period (discovery period) corresponds to a multiple of time T, whereby efficient D2D communication may be performed through only one synchronization process. Referring to FIG. 19, during the hopping time interval, the 1$^{st}$ user equipment spends time 6T corresponding to a double of a 1$^{st}$ channel hopping sequence period 3T by repeating the 1$^{st}$ channel hopping sequence twice in the hopping time interval. And, during the discovery time interval, the 1$^{st}$ user equipment spends time 2T corresponding to a double of a 2$^{nd}$ channel hopping sequence period T by repeating the 2$^{nd}$ channel hopping sequence twice. Therefore, the entire discovery period (discovery period) amounts to time 8T. And, since it is also a multiple of T, entire synchronization may be achieved through only one synchronization process.

FIGS. 20 and 21 are diagrams for examples of a user equipment discovery process according to one embodiment of the present invention.

FIG. 20 shows a case that a 1$^{st}$ user equipment fails in discovering a new user equipment C. The 1$^{st}$ user equipment that intends to new D2D communication may operate in a manner of sorting a discovery period into a hopping time interval and a discovery time interval. As mentioned in the foregoing description, the 1$^{st}$ user equipment operates in the hopping time interval according to a 1$^{st}$ channel hopping sequence and may transceive data with an existing user equipment (i.e., user equipment B not shown in the drawing). In FIG. 20, the 1$^{st}$ channel hopping sequence is set to ch.1→ch.2→ch.3 and the 1$^{st}$ user equipment may stay on each channel for the same time T. The 1$^{st}$ user equipment operates in the discovery time interval according to the 2$^{nd}$ channel hopping sequence and may perform a process for discovering the user equipment C corresponding to a 2$^{nd}$ user equipment. In FIG. 20, the 2$^{nd}$ channel hopping sequence is set to ch.1→ch.2→ch.3 and the 1$^{st}$ user equipment operates according to one time of a 2$^{nd}$ channel hopping period. Moreover, in FIG. 20, the 1$^{st}$ user equipment fails in discovering the 2$^{nd}$ user equipment since the 1$^{st}$ user equipment fails in receiving a probe response message (frame) corresponding to a response to a probe request message (frame), which is transmitted by the 1$^{st}$ user equipment to the 2$^{nd}$ user equipment. Since the 1$^{st}$ user equipment and the user equipment C corresponding to the 2$^{nd}$ user equipment fail in discovering each other and synchronization is not also matched between them, a time for which the user equipment C stays on each channel may be different from that for which the 1$^{st}$ user equipment stays on each channel. Hence, the 1$^{st}$ user equipment may discover the 2$^{nd}$ user equipment during the 2$^{nd}$ channel hopping period with a low probability.

FIG. 21 shows a case that a 1$^{st}$ user equipment discovers a 2$^{nd}$ user equipment.

Unlike FIG. 20, in FIG. 21, a 1$^{st}$ user equipment operates in a manner of repeating a 2$^{nd}$ channel hopping period by 2 times. However, FIG. 21 is similar to FIG. 20 in that the 1$^{st}$ user equipment operates in a hopping time interval. The 1$^{st}$ user equipment repeats a 2$^{nd}$ channel hopping sequence twice in a discovery time interval, whereby a time interval for discovering a 2$^{nd}$ user equipment is doubled. It may be checked in the drawing that the 1$^{st}$ user equipment receives a probe response frame on ch.2 of a second 2$^{nd}$ channel hopping period from the 2$^{nd}$ user equipment. In this case, since the 1$^{st}$ user equipment may discover the 2$^{nd}$ user equipment, which is not discovered in a first 2$^{nd}$ channel hopping period, during the discovery time interval in a manner of repeating the 2$^{nd}$ channel hopping period twice, the probability of discovering the 2$^{nd}$ user equipment may be increased.

As mentioned in the above description, the probability of discovering the $2^{nd}$ user equipment may be increased in a manner that the $1^{st}$ user equipment repeats the discovery time interval by n times after the hopping time interval. However, since an entire discovery period (discovery period) includes the hopping time interval in which a user equipment performs communication with an existing connected user equipment, if the discovery time interval is set to a long time interval, it may decrease a quality of communication with the existing connected user equipment. Thus, a method of efficiently controlling a hopping time interval and a discovery time interval in an entire discovery period is required.

FIG. 22 shows experimental values with respect to probability of discovering a $2^{nd}$ user equipment depending on the number of repetitions of a discovery time interval according to one embodiment of the present invention.

In FIGS. 22 (a) to (d), an environment with no ISI (inter symbol interference) is premised. A time slot 1 interval (1T) is 10 msec. Since a discovery time interval corresponds to 1T, it is also 10 msec. Moreover, since the present experiment has total 3 hopping channel, it is performed in a condition of a hopping time interval of 3T, i.e., 30 msec.

FIGS. 22 (a) to (d) shows a time for discovering a user equipment in Wi-Fi Direct environment. FIG. 22 (a) shows that an average time spent for discovering a $2^{nd}$ user equipment is 276 ms in case of repeating a $2^{nd}$ channel hopping period by one time during a discovery time interval. On the other hand, as shown in FIG. 22 (b), the average time spent for discovering the $2^{nd}$ user equipment is 247 ms in case of repeating the $2^{nd}$ channel hopping period by 2 times during the discovery time interval. Thus, it may be known that the average time spent for discovering the $2^{nd}$ user equipment in the latter case may be reduced by 10.5% compared to the former case. The reduction in the time spent for discovering the user equipment may be interpreted as increase in probability of discovering the user equipment.

FIGS. 22 (c) and (d) show a time spent for discovering a user equipment in D2D communication according to the present invention. FIG. 22 (c) shows that the average time spent for discovering the $2^{nd}$ user equipment is 99 ms in case of repeating the $2^{nd}$ channel hopping period by one time during the discovery time. On the other hand, as shown in FIG. 22 (d), the average time spent for discovering the $2^{nd}$ user equipment is 71 ms in case of repeating the $2^{nd}$ channel hopping period by 2 times during the discovery time interval. Thus, it may be known that the average time spent for discovering the $2^{nd}$ user equipment in the latter case may be reduced by about 28.3% compared to the former case. The reduction in the time spent for discovering the user equipment may be interpreted as the increase in the probability of discovering the user equipment.

As mentioned in the foregoing description with reference to FIG. 22, as the discovery time interval is set to be long, i.e., as the number of repetitions of the $2^{nd}$ channel hopping period increase, the probability of discovering the $2^{nd}$ user equipment increases. However, since an entire discovery period (discovery period) includes a time for transceiving data with an existing connected user equipment in a hopping time interval besides the discovery time interval, efficient distribution of time is necessary. When the $2^{nd}$ channel hopping period is repeated by 2 times in the discovery time interval, the time spent for discovering the $2^{nd}$ user equipment is reduced most significantly compared to one time repetition. And, if the $2^{nd}$ channel hopping period is repeated by many times, it may decrease a quality of existing D2D communication. Therefore, it is proposed in the present invention that the $2^{nd}$ channel hopping period is repeated by 2 times. However, the present invention is not limited to 2-times repetition of the $2^{nd}$ channel hopping period and it is also possible to configure a different number of repetitions FIGS. 23 to 24 are diagrams of a re-synchronization process according to one embodiment of the present invention.

Figure 23:
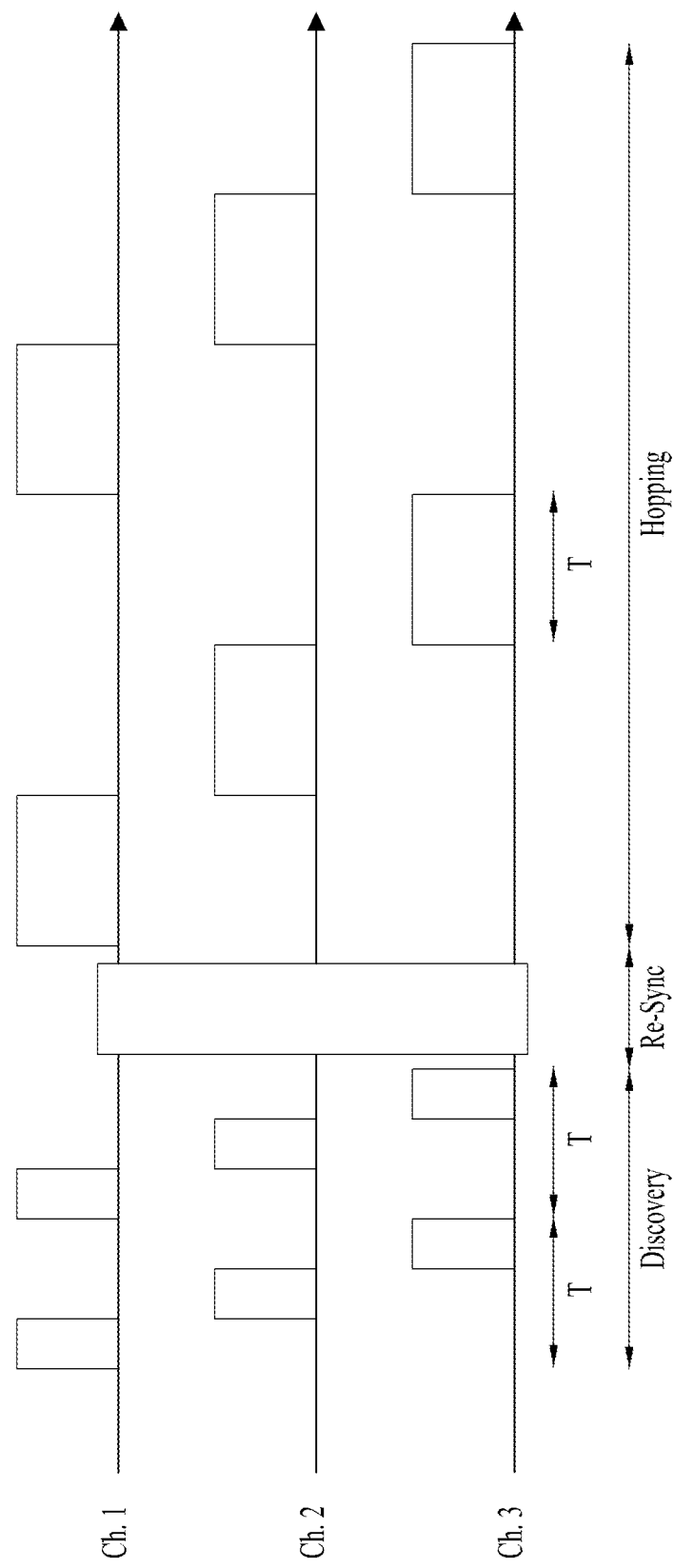

FIG. 23 shows a process for performing re-synchronization after a discovery time interval in an entire discovery period. The following description is given with reference to FIG. 23 on the premise that a $1^{st}$ user equipment discovers a $2^{nd}$ user equipment in a manner of repeating a $2^{nd}$ channel hopping sequence by 2 times during a $2^{nd}$ channel hopping period T in a discovery time interval. After discovering the $2^{nd}$ user equipment in the discovery time interval, the $1^{st}$ user equipment may priory match synchronization with the $2^{nd}$ user equipment instead of performing communication with an existing connected user equipment. The $1^{st}$ user equipment may spend a prescribed time in order to match synchronization with the $2^{nd}$ user equipment. Having matched synchronization with the $2^{nd}$ user equipment, the $1^{st}$ user equipment may perform later process for communicating with the existing connected user equipment and the newly discovered $2^{nd}$ user equipment.

Figure 24:
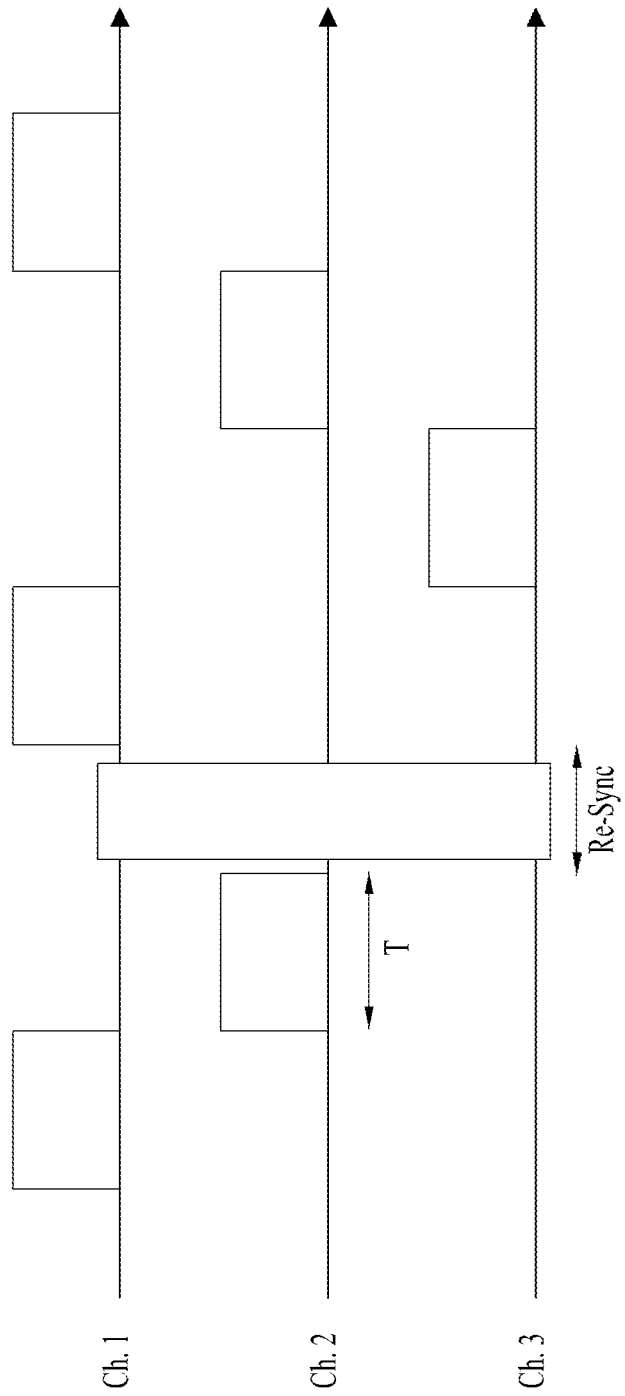

FIG. 24 shows a process for performing re-synchronization during communication with an existing connected user equipment, i.e., in the course of transceiving data. In other words, re-synchronization is not necessarily performed after a discovery time interval but it can be performed during a hopping time interval.

Figure 25:
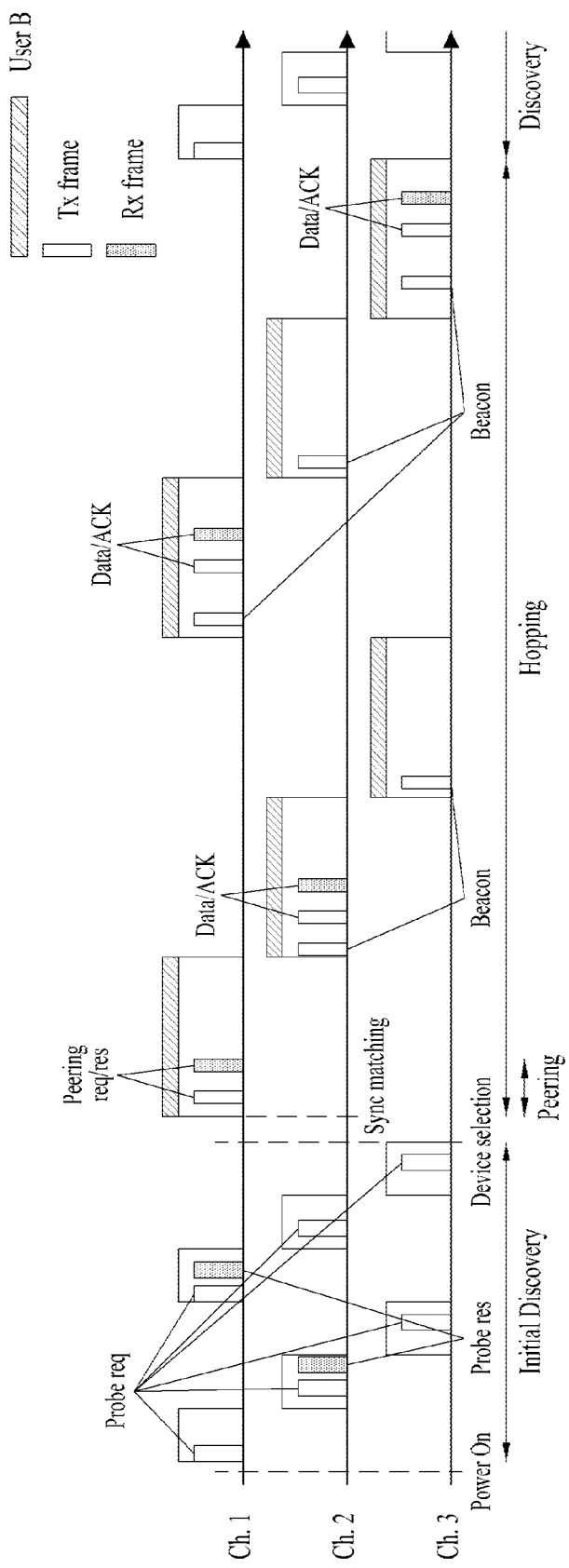

FIG. 25 shows operations of a $1^{st}$ user equipment according to one embodiment of the present invention.

Referring to FIG. 25, through power-on or an initialization operation, the $1^{st}$ user equipment may discover a target user equipment (i.e., user equipment B) in a manner of hopping on channels according to elapse of time. It should be note that the $1^{st}$ user equipment has no existing connected user equipment. The $1^{st}$ user equipment may transmit a probe request message by repeating channel hopping sequence by 2 times in a discovery time interval. And, the $1^{st}$ user equipment may receive a probe response message in response to the probe request message from a different user equipment during the discovery time interval. Having received the probe response message from the different user equipment, the $1^{st}$ user equipment may attempt connection in a manner of obtaining information on the user equipment, which has transmitted the probe response message. If receiving probe response messages from at least two user equipment, the $1^{st}$ user equipment may attempt connection by selecting one from at least two user equipment.

In order to connect a session with the selected user equipment (i.e., user equipment B), the $1^{st}$ user equipment may perform a synchronization process. After matching synchronization, the $1^{st}$ user equipment may transmit a connection request message (peering request frame) to the selected user equipment, receive a connection response message (peering response frame) in response to the connection request message (peering request frame), and then complete the connection. Since the two user equipment exchange channel hopping sequence and synchronization information with each other during the connection process, each of the two user equipment operates according to its channel hopping sequences and performs D2D communication. In this case, when communicating with the connected user equipment, the $1^{st}$ user equipment may include information of the user equipment in a beacon frame except data and then transmit the beacon frame by periods. In the case of the beacon frame, it may not be transmitted at every hopping in consideration of overhead but be transmitted according to a predetermined period.

It should be note that although the $1^{st}$ user equipment may perform active scanning that transmits the probe request message in order to discover a new user equipment, the $1^{st}$ user equipment may receive a beacon frame transmitted by a different user equipment and then perform passive scanning to discover the different user equipment based on the beacon frame.

Figure 26:
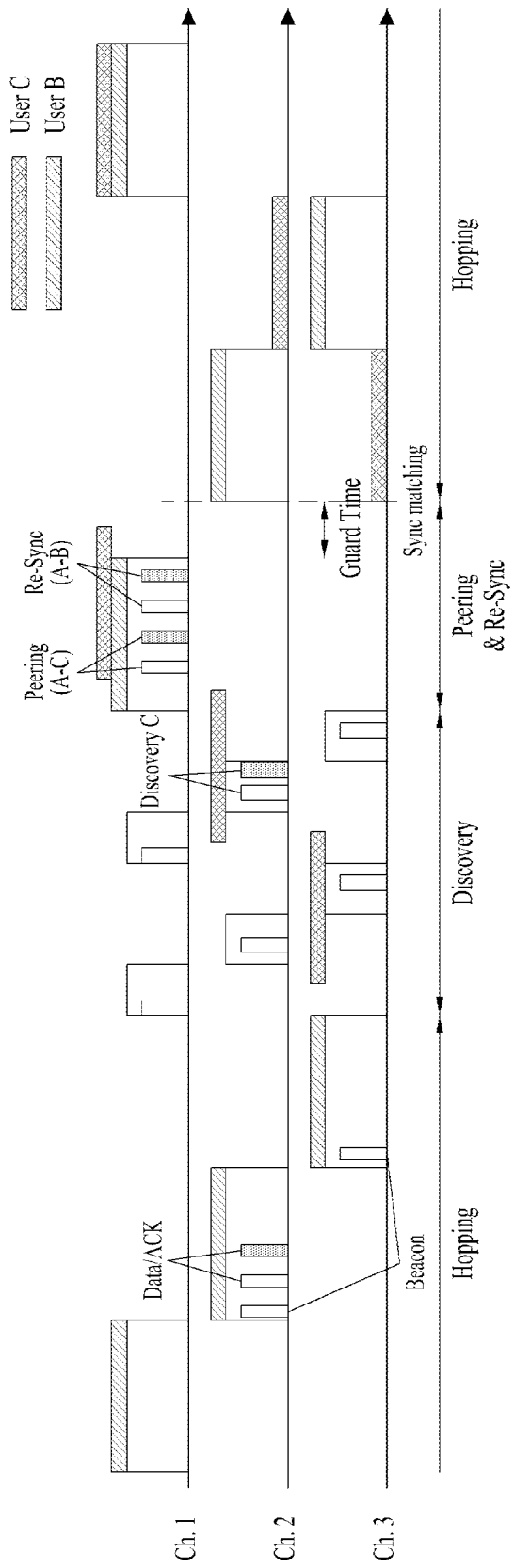

FIG. 26 shows another example of operations of a $1^{st}$ user equipment according to one embodiment of the present invention.

It should be noted that in FIG. 26, a $1^{st}$ user equipment has an existing connected user equipment unlike FIG. 25. FIG. 26 shows a process according to the present invention. In particular, while performing existing D2D communication, a $1^{st}$ user equipment discovers a new user equipment C (i.e., $2^{nd}$ user equipment) and performs a connection process. The $1^{st}$ user equipment may communicate with an existing connected user equipment (i.e., user equipment B) in a manner of hopping on channels during a hopping time interval. The $1^{st}$ user equipment may perform a process for discovering the new user equipment in a manner of repeating channel hopping sequence by 2 times during a discovery time interval. If the $1^{st}$ user equipment receives a probe response message from the new user equipment in a manner of transmitting a probe request message in the discovery time interval, the $1^{st}$ user equipment may attempt connection with the newly discovered $2^{nd}$ user equipment. After the discovery time interval, the $1^{st}$ user equipment may transmit a connection request message (peering request frame) to the newly discovered $2^{nd}$ user equipment (i.e., user equipment C) and the $2^{nd}$ user equipment may transmit a connection response message (peering response frame) in response to the connection request message to the $1^{st}$ user equipment.

Having exchanged information on the communication connection session with the $2^{nd}$ user equipment, the $1^{st}$ user equipment may perform a re-configuration for the existing communication environment together with the existing connected user equipment. If the $1^{st}$ user equipment (i.e., user equipment A) accepts synchronization of the $2^{nd}$ user equipment in the course of performing synchronization with the newly discovered $2^{nd}$ user equipment, the user equipment (i.e. user equipment B), which has been previously connected with the $1^{st}$ user equipment, needs to match synchronization with the $1^{st}$ user equipment again. In determining a channel synchronization reference user equipment, various types of standards may be applied as mentioned in the foregoing description.

After the $1^{st}$ user equipment matches synchronization with the $2^{nd}$ user equipment and the existing connected user equipment, the three user equipment may have a prescribed guard time since the three user equipment need to operate according to the same synchronization information. In case of synchronization between two user equipment, communication may be performed immediately after the synchronization. However, in the case of synchronization between three user equipment, synchronization between the existing connections needs to be adjusted. In this case, synchronization between all the user equipment may be matched in a manner of having the guard time. After elapse of the guard time, the three user equipment may perform D2D communications by performing channel hopping based on each channel hopping sequence of its own.

FIG. 27 shows a structure of a beacon frame according to one embodiment of the present invention.

A $1^{st}$ user equipment may transmit a beacon frame by including its own information in the beacon frame in order to transmit its own information to a different user equipment. If a user equipment receives the beacon frame, the user equipment may be aware of channel hopping sequence and synchronization information of the $1^{st}$ user equipment.

The beacon frame may include a synchronization time field, a hopping sequence field, a discovery period field, a synchronization metric field, and a peered link information field.

The synchronization time field includes synchronization time information of a user equipment. It is possible to indicate a time remaining until a next channel hopping time and an elapsed time as well with reference to a time of transmission of the beacon frame.

The hopping sequence field includes channel hopping sequence information of a user equipment. In particular, it corresponds to information indicating an operating order of a plurality of channels.

The discovery period field corresponds to information indicating an entire discovery period. The entire discovery period is sorted into a hopping time interval and a discovery time interval. Data transceiving in D2D communication is actually performed in the hopping time interval and a process for discovering a user equipment is performed in the discovery time interval.

The synchronization metric field indicates information on a user equipment determined as a channel synchronization reference user equipment or a standard used for matching channel synchronization between two user equipment. Since the method of determining the channel synchronization reference user equipment is explained in the foregoing description, redundant description will be omitted.

The peered link information field indicates information on link connected to a user equipment. The peered link information field may include a peered link number field (field of the number of peered links), an address field, an application information field and a hopping sequence field.

The peered link number field (field of the number of peered links) indicates the number of sessions currently connected to a user equipment and the address field indicates a connection address of the corresponding user equipment. The application information field includes information on a currently running application in the corresponding user equipment and the hopping sequence field includes hopping sequence information of a connected user equipment. Except the peered link number field (field of the number of peered links), the address field, the application information field and the hopping sequence field in the peered link information field may be indicated repeatedly per connected user equipment.

FIG. 28 shows a structure of a connection request/response frame according to one embodiment of the present invention.

After matching synchronization with a discovered user equipment, a user equipment may transceive a connection request frame and a connection response frame in order to connect a communication session. The connection request/response frame may include a synchronization time field, a hopping sequence field, a discovery period field, an application information field, a synchronization metric field, and a guard time field.

The synchronization field includes synchronization time information of a user equipment. It is possible to indicate a time remaining until a next channel hopping time and an elapsed time as well with reference to a time of transmission of the beacon frame.

The hopping sequence filed includes channel hopping sequence information of a user equipment. In particular, it corresponds to information indicating an operating order of a plurality of channels. For a newly discovered $2^{nd}$ user equipment, a $1^{st}$ user equipment may include changed channel hopping sequence information, of which the use is requested by a $2^{nd}$ user equipment, in the hopping sequence field of the connection request frame instead of its channel hopping sequence information. Having received the connection request frame, the $2^{nd}$ user equipment may operate based on channel hopping sequence transmitted by the $1^{st}$ user equipment. And, the $2^{nd}$ user equipment may change channel hopping sequence information transmitted by the $1^{st}$ user equipment and then transmit the changed channel hopping sequence information in a manner of including the change channel hopping sequence information in the hopping sequence field of the connection response frame.

The discovery period field corresponds to information indicating an entire discovery period. The entire discovery period is sorted into a hopping time interval and a discovery time interval. Data transceiving in D2D communication is actually performed in the hopping time interval and a process for discovering a user equipment is performed in the discovery time interval.

The application information field includes information on a currently running application in a corresponding user equipment.

The synchronization metric field indicates information on a user equipment determined as a channel synchronization reference user equipment or a standard used for matching channel synchronization between two user equipment.

The guard time field indicates a time for which a user equipment prepares actual communication after matching synchronization.

FIG. 29 is a block diagram for a configuration of a wireless communication device according to one embodiment of the present invention.

Referring to FIG. 29, a wireless communication system includes a base station 2910 and a plurality of D2D user equipment 2920 located within an area of the base station 2920. In this case, the D2D user equipment 2920 may include both of the source user equipment and the target user equipment mentioned in the foregoing description.

The base station 2920 may include a processor 2911, a memory 2912 and an RF (radio frequency) unit 2913 (or transceiver). The processor 2911 implements the proposed functions, processes and/or methods. Layers of a radio interface protocol can be implemented by the processor 2911. The memory 2912 is connected with the processor 2911 and then stores various kinds of information to drive the processor 2911. The RF unit 2913 is connected with the processor 2911 and then transmits and/or receives radio signals The D2D user equipment 2920 includes a processor 2921, a memory 2922 and an RF (radio frequency) unit 2923 (or transceiver). The processor 2921 implements the proposed functions, processes and/or methods. Layers of a radio interface protocol can be implemented by the processor 2921. The memory 2922 is connected with the processor 2911 and then stores various kinds of information to drive the processor 2911. The RF unit 2923 is connected with the processor 2921 and then transmits and/or receives radio signals.

The memory 2912/2922 may be provided within or outside the processor 2911/2921. And, the memory 2912/2922 may be connected with the processor 2911/2921 via various kinds of well-known means. Moreover, the base station 2910 and/or the D2D user equipment 2920 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. Moreover, in this document, 'base station (BS)' may be substituted with such a terminology as a fixed station, a Node B, an eNode B (eNB), an access point (AP) and the like.

Embodiments according to the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various well-known means.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents.

INDUSTRIAL APPLICABILITY INDUSTRIAL APPLICABILITY

Although a method of discovering a user equipment for D2D communication in a wireless communication system and apparatus therefor are mainly described with reference to the examples of applying to 3GPP LTE system, as mentioned in the foregoing description, the present invention can apply to various kinds of wireless communication systems as well as to the 3GPP LTE system.

What is claimed is:

1. A method of performing device-to-device (D2D) communication in a wireless communication system, the method comprising:
communicating, by a first user equipment, with an existing connected user equipment currently connected with the first user equipment through at least one channel among a plurality of channels while hopping on a plurality of the channels based on a first channel hopping period and a first channel hopping sequence;
discovering, by the first user equipment, a second user equipment to newly connect with while hopping on the plurality of the channels based on a second channel hopping period and a second channel hopping sequence; and
performing, by the first user equipment, synchronization with the discovered second user equipment,
wherein the first channel hopping period is configured with identical time intervals for each of the plurality of the channels and
wherein one time interval among the configured time intervals is set equal to the second channel hopping period.

2. The method of claim 1, wherein discovering the second user equipment to newly connect with comprises discovering the second user equipment by repeating a channel hopping twice based on the second channel hopping sequence during a double of the second channel hopping period.

3. The method of claim 1, wherein the first channel hopping sequence of the first user equipment is different from the second channel hopping sequence of the first user equipment.

4. The method of claim 1, wherein the first channel hopping sequence of the first user equipment is identical to the second channel hopping sequence of the first user equipment.

5. The method of claim 1, wherein performing, by the first user equipment, the synchronization with the second user equipment further comprises transmitting, by the first user equipment, a connection request message to the second user equipment and receiving a connection response message in response to the connection request message from the second user equipment and wherein the connection request message comprises synchronization information of the first user equipment and channel hopping sequence information of the first user equipment.

6. The method of claim 1, further comprising: performing, by the first user equipment, the synchronization with the second user equipment and performing, by the first user equipment, synchronization with the existing connected user equipment based on the synchronization matched with the second user equipment.

7. The method of claim 6, further comprising: communicating, by the first user equipment, with the second user equipment and the existing connected user equipment after an elapse of a prescribed time since performing the synchronization with the second user equipment and the existing connected user equipment.

8. The method of claim 1, wherein discovering, by the first user equipment, the second user equipment to newly connect with further comprises:
transmitting, by the first user equipment, a probe request message to the second user equipment; and
receiving, by the first user equipment, a probe response message in response to the probe request message from the second user equipment.

9. The method of claim 8, wherein a scheme for the first user equipment to transmit the probe request message comprises one of unicast, multicast and broadcast.

10. The method of claim 1, wherein the first channel hopping sequence of the first user equipment before discovering the second user equipment is different from a channel hopping sequence after performing the synchronization with the second user equipment.

11. The method of claim 1, wherein the second user equipment performs the D2D communication with a user equipment other than the first user equipment.

12. A method of performing device-to-device (D2D) communication in a wireless communication system, comprising:
receiving, by a second user equipment, a probe request message from a first user equipment;
transmitting, by the second user equipment, a probe response message in response to the probe request message to the first user equipment; and
performing, by the second user equipment, synchronization with the first user equipment,
wherein the first user equipment communicates with an existing connected user equipment currently connected with the first user equipment through at least one channel among a plurality of channels while hopping on a plurality of the channels based on a first channel hopping sequence during a first channel hopping period,
wherein the first user equipment transmits the probe request message to the second user equipment while hopping on a plurality of the channels based on a second channel hopping period and a second channel hopping sequence,
wherein the first channel hopping is configured with identical time intervals for each of the plurality of the channels, and
wherein one time interval among the configured time intervals is set equal to the second channel hopping period.

13. A first user equipment performing device-to-device (D2D) communication in a wireless communication system, the first user equipment comprising:
a transceiver; and
a processor that:
controls the transceiver to communicate with an existing connected user equipment currently connected with the first user equipment through at least one channel among a plurality of channels while hopping on a plurality of the channels based on a first channel hopping period and a first channel hopping sequence, and
discovers a second user equipment to connect newly with while hopping on a plurality of the channels based on a second channel hopping period and a second channel hopping sequence, and match synchronization with the discovered second user equipment,
wherein the first channel hopping is configured with identical time intervals for each of the plurality of the channels, and
wherein one time interval among the configured time intervals is set equal to the second channel hopping period.

* * * * *